(12) United States Patent
Dong et al.

(10) Patent No.: US 12,496,557 B2
(45) Date of Patent: Dec. 16, 2025

(54) CERAMIC MEMBRANE TECHNOLOGY FOR MOLECULE-RANGE SEPARATION

(71) Applicant: Agency for Science, Technology and Research, Singapore (SG)

(72) Inventors: Xuecheng Dong, Singapore (SG); Eng Toon Saw, Singapore (SG); Kun Liang Ang, Singapore (SG); Wei He, Singapore (SG)

(73) Assignee: Agency for Science, Technology and Research, Singapore (SG)

( * ) Notice: Subject to any disclaimer, the term of this patent is extended or adjusted under 35 U.S.C. 154(b) by 461 days.

(21) Appl. No.: 17/924,298

(22) PCT Filed: May 12, 2021

(86) PCT No.: PCT/SG2021/050263
§ 371 (c)(1),
(2) Date: Nov. 9, 2022

(87) PCT Pub. No.: WO2021/230820
PCT Pub. Date: Nov. 18, 2021

(65) Prior Publication Data
US 2023/0338904 A1   Oct. 26, 2023

(30) Foreign Application Priority Data

May 12, 2020   (SG) ............ 10202004382U

(51) Int. Cl.
*B01D 71/02*   (2006.01)
*B01D 67/00*   (2006.01)
(Continued)

(52) U.S. Cl.
CPC ....... *B01D 71/027* (2013.01); *B01D 67/0051* (2013.01); *B01D 67/0076* (2013.01);
(Continued)

(58) Field of Classification Search
None
See application file for complete search history.

(56) References Cited

U.S. PATENT DOCUMENTS

2002/0142172 A1   10/2002   Brinker et al.
2006/0266696 A1   11/2006   Masuda et al.
(Continued)

FOREIGN PATENT DOCUMENTS

WO   8805769 A1   8/1988

OTHER PUBLICATIONS

Sano et al., "Separation of Ethanol/Water Mixture by Silicalite Membrane on Pervaporation," Journal of Membrane Science, vol. 95, 1994, pp. 221-228.
(Continued)

*Primary Examiner* — Krishnan S Menon
(74) *Attorney, Agent, or Firm* — Shackelford, McKinley & Norton, LLP

(57) ABSTRACT

A method of producing a silicalite membrane, which includes heating an aqueous solution that includes a dopant precursor and structure-directing template agents to form silicalite seeds incorporated with a dopant, depositing a buffer layer on a ceramic substrate prior to depositing the silicalite seeds on the buffer layer, contacting the ceramic substrate with a solution including the silicalite seeds to form a silicalite layer from the silicalite seeds on the ceramic substrate, and removing the structure-directing template agents to form the silicalite membrane, where the silicalite layer includes silicalite crystals incorporated with a dopant and each of the silicalite crystals has a hollow structure which forms the pores of the silicalite layer. The silicalite membrane includes a ceramic substrate having a buffer layer
(Continued)

formed thereon, and a silicalite layer formed on the buffer layer, where the silicalite layer includes silicalite crystals incorporated with a dopant.

13 Claims, 10 Drawing Sheets

(51) Int. Cl.
*B01D 69/04* (2006.01)
*B01D 69/10* (2006.01)

(52) U.S. Cl.
CPC .............. *B01D 69/04* (2013.01); *B01D 69/10* (2013.01); *B01D 69/108* (2022.08); *B01D 71/0281* (2022.08); *B01D 2323/081* (2022.08); *B01D 2323/216* (2022.08); *B01D 2323/24* (2013.01); *B01D 2323/48* (2013.01)

(56) References Cited

U.S. PATENT DOCUMENTS

2019/0160437 A1  5/2019  Yano et al.
2020/0078743 A1  3/2020  Omori et al.

OTHER PUBLICATIONS

Ueno et al., "Hydrophobic *BEA-Type Zeolite Membranes on Tubular Silica Supports for Alcohol/Water Separation by Pervaporation," Membranes, vol. 9, No. 86, 2019, pp. 1-13.

Sano et al., "Potentials of Silicalite Membranes for the Separation of Alcohol/Water Mixtures," Studies in Surface Science and Catalysis, vol. 84, 1994, pp. 1175-1182.

Li et al., "X-Type Zeolite Membranes: Preparation, Characterization, and Pervaporation Performance," Microporous and Mesoporous Materials, vol. 53, 2002, pp. 59-70.

Li et al., "Properties and Separation Performance of Ge-ZSM-5 Membranes," Microporous and Mesoporous Materials, vol. 58, 2003, pp. 137-154.

Kittur et al., "Preparation of Zeolite-Incorporated Poly(dimethyl siloxane) Membranes for the Pervaporation Separation of Isopropyl Alcohol/Water Mixtures," Journal of Applied Polymer Science, vol. 96, 2005, pp. 1377-1387.

Shirazi et al., "Recovery of Alcohols from Water Using Polydimethylsiloxane-Silica Nanocomposite Membranes: Characterization and Pervaporation Performance," Journal of Applied Polymer Science, vol. 124, 2012, pp. 2871-2882.

Guan et al., "Separating Isopropanol from its Diluted Solutions via a Process of Integrating Gas Stripping and Vapor Permeation," RSC Advances, vol. 5, 2015, pp. 24031-24037.

Li et al., "Separation Process of Butanol-Butyl Acetate-Methyl Isobutyl Ketone System by the Analysis to Residual Curve and the Double Effect Pressure-Swing Distillation," Chinese Journal of Chemical Engineering, vol. 25, 2017, pp. 274-277.

International Search Report for International Application No. PCT/SG2021/050263 dated Aug. 11, 2021, pp. 1-4.

Written Opinion of the International Searching Authority for International Application No. PCT/SG2021/050263 dated Aug. 11, 2021, pp. 1-4.

FIG. 1

| Membrane | Membrane Performance |
|---|---|
| Perfluorinated ionomer membrane | N.A. |
| B-ZSM-11 | Isopropanol Separation (5% isopropanol at 60°C) Separation factor: 16; Flux: 310 g/m².hr |
| Ge-ZSM-5 | Isopropanol Separation (5% isopropanol at 30°C); Separation factor: 29; Flux: 91 g/m².hr |
| 30% ZSM-5 loading PDMS | Isopropanol Separation (10% isopropanol at 50°C); Separation factor: 11.2; Flux: 104.8 g/m².hr |
| 3wt% TMSH-Silica loading PDMS | Isopropanol Separation (4% isopropanol at 50°C) Separation factor: 31.7; Flux: 405 g/m².hr |
| PDMS Membrane | Isopropanol Separation (3% isopropanol at 75°C) Separation factor: 125.8; Flux: 437.8 g/m².hr |

FIG. 2

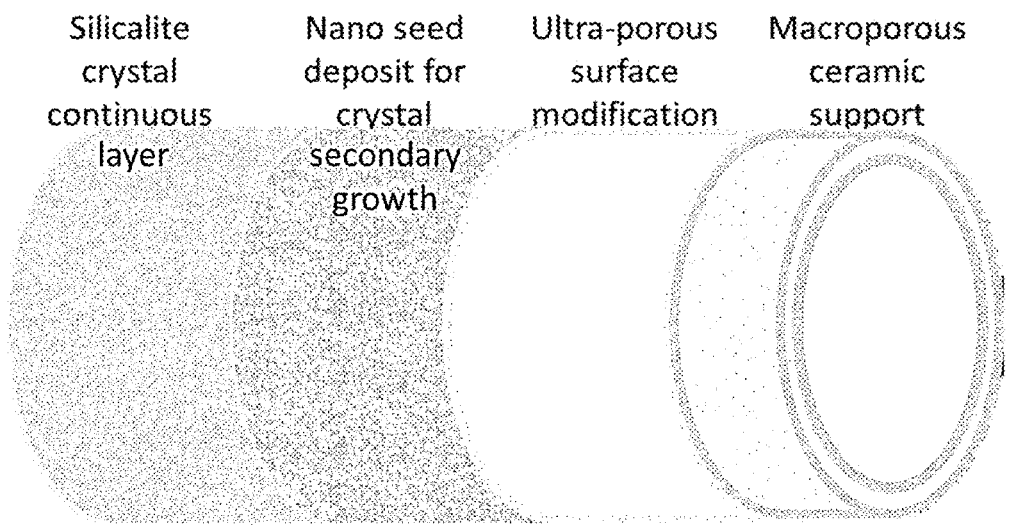

CERAMIC MEMBRANE TECHNOLOGY FOR MOLECULE-RANGE SEPARATION

CROSS-REFERENCE TO RELATED APPLICATION

This application claims the benefit of priority of Singapore Patent Application No. 102020043820, filed 12 May 2020, the content of it being hereby incorporated by reference in its entirety for all purposes.

TECHNICAL FIELD

The present disclosure relates to a silicalite membrane and a method of producing the silicalite membrane.

BACKGROUND

Membrane technology may be a generic term for a number of different characteristic separation processes at different scales of dimension. The principle in general is that the membrane acts as a specific filter that allows certain substance with distinct molecule size to flow through, rejecting the rest with larger dimensions, e.g. suspended solids—known as particle separation; bacteria, tobacco smoke—removal by the micro-filtration; virus, gelatine, albumin protein—by ultra-filtration; sugar, pesticide—by nano-filtration, and water desalination by reverse osmosis.

Also, in general, due to the material technology, the related manufacturing cost of the membrane increases as the membrane "filtration/separation size" reduces from micro to nano and sub-nano to molecule-range. The smaller the filtration/separation size is, the more expensive the membrane costs. The selection of membrane material also becomes more demanding as the "pore" size goes extremely small. For example, the "skin" layer in a commercial reverse osmosis membrane tends to be restricted to a special type of polymer only. In addition, the selection of a membrane tends to be based on the specific application it is used in and its performance requirement. There is no generic solution of one membrane for all applications. For instance, due to polymer swelling issue, commercial application of reverse osmosis membrane is limited to water treatment and not suitable for non-aqueous system, such as separation of one organic solvent from another.

Moreover, as the "pore" size goes bigger, e.g. from nano- to ultra-filtration, ceramic membranes and ceramic-polymer composite membranes are more widely used in commercial applications. At ultra- and micro-filtration levels, ceramic membrane may be more competitive over polymer, due to better solvent durability and narrower "pore" size distribution.

For example, zeolite ceramic membranes have been developed for molecular separation. Currently, ceramic membrane material for molecular separation tends to include zeolite. Alumino-silicate zeolite ceramic has uniform and well-defined separation size in crystalline hollow structure. Numerous alumino-silicate zeolites have been developed for water treatment applications.

Apart from water treatment applications, zeolite has also been reported for solvent dehydration, which is to remove water (usually less than 20 wt %) from a solvent. The type of solvent may include ethanol, ethylene glycol, etc. This process is challenging as the zeolite crystal material has to be selective and consistent in size to allow specifically water molecules to permeate.

Besides alumino-silicate zeolite ceramic membranes in water treatment and solvent dehydration, there appears to be no other pure ceramic membrane commercially available for molecule-range separation. Particularly, there appears to be no commercial ceramic membrane technology for non-aqueous system treatment.

In another development, zeolite-loaded polymer composite membranes were explored for molecular separation.

Although zeolite ceramic membranes may have been commercialized for water treatment and certain types of solvent dehydration processes, such zeolite membranes tend not to be suitable for treating water with large quantities of solvent waste up to 20 wt %, i.e. solvent amount (less than 20 wt %) with the majority being water. For these particular separation applications, zeolite-loaded polymer composite membranes (wherein the polymer includes, e.g. polyvinyl alcohol (PVA), chitosan, polyacrylonitrile (PAN), polydimethylsiloxane (PDMS), and/or polybenzimidazole (PBI)) have been explored for treating and recovering the solvent. FIG. 1 depicts some reported examples of such zeolite-loaded polymer composite membranes.

As shown in FIG. 1, commercial membranes for molecular separation include reverse osmosis membrane, zeolite ceramic membrane, and zeolite-loaded composite membrane. Applications of these types of membrane cover water treatment, solvent dehydration, and high-solvent-content water recovery.

For molecular separation in a non-aqueous system, especially organic solvent streams, reverse osmosis and composite membranes are rarely used, due to membrane swelling issue. Pure ceramic membrane appears to remain a preferred material of choice for non-aqueous system, unfortunately, newer technologies, other than zeolite ceramic dehydration membrane, do not appear available.

There is thus a need to provide for a solution that addresses one or more of the limitations mentioned above. The solution should at least provide for a method that directly synthesizes a membrane having a continuous crystal membrane layer with a defined permeation size for specific molecular separation requirement, wherein the membrane is operably applicable in non-aqueous stream processing systems.

SUMMARY

In a first aspect, there is provided a method of producing a silicalite membrane, the method includes:
heating an aqueous solution that includes a dopant precursor and structure-directing template agents to form silicalite seeds incorporated with a dopant;
depositing a buffer layer on a ceramic substrate prior to depositing the silicalite seeds on the buffer layer;
contacting the ceramic substrate with a solution including the silicalite seeds to form a silicalite layer from the silicalite seeds on the ceramic substrate; and
removing the structure-directing template agents to form the silicalite membrane, wherein the silicalite layer includes silicalite crystals incorporated with a dopant and each of the silicalite crystals has a hollow structure which forms the pores of the silicalite layer.

In another aspect, there is provided a silicalite membrane including:
a ceramic substrate having a buffer layer formed thereon; and
a silicalite layer formed on the buffer layer, wherein the silicalite layer includes silicalite crystals incorporated with a dopant and each of the silicalite crystals has a hollow structure which forms the pores of the silicalite layer.

BRIEF DESCRIPTION OF THE DRAWINGS

The drawings are not necessarily to scale, emphasis instead generally being placed upon illustrating the principles of the present disclosure. In the following description, various aspects and embodiments of the present disclosure are described with reference to the following drawings, in which:

FIG. 1 is a table showing membranes and their performance for alcohol recovery. N. A. denotes for not applicable.

FIG. 2 shows the configuration of a silicalite membrane of the present disclosure. The silicalite membrane has a crystal ceramic layer (continuous silicalite crystal layer) on a macroporous ceramic support. The ceramic support may have its surface modified to have a transition layer thereon to confer material compatibility with the continuous silicalite crystal membrane layer, which is generated by crystal seeding and secondary growth of the seeded crystals (nano-seed deposit for crystal secondary growth). Formation of the transition layer on the ceramic support may render an ultra-porous surface thereon. The seeded crystals may be nano-seeds.

DETAILED DESCRIPTION

Figure 3:
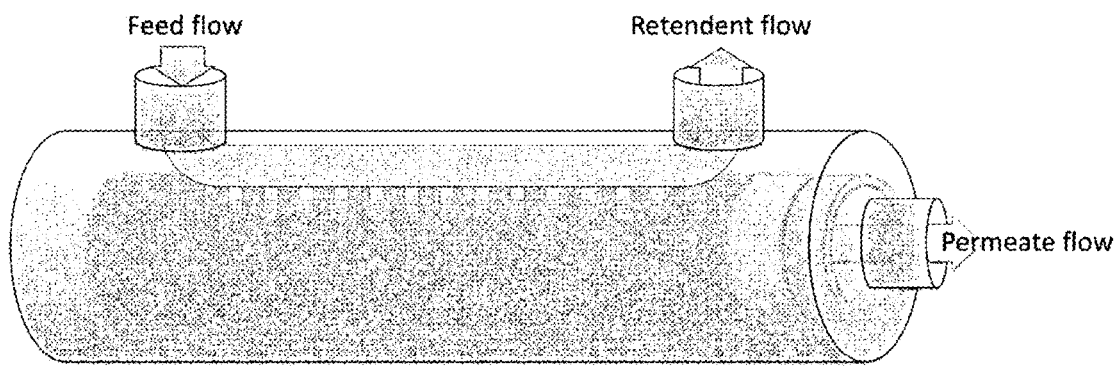
FIG. 3 shows a single tubular module and the cross-flow separation process design.

The following detailed description refers to the accompanying drawings that show, by way of illustration, specific details and embodiments in which the present disclosure may be practised.

Features that are described in the context of an embodiment may correspondingly be applicable to the same or similar features in the other embodiments. Features that are described in the context of an embodiment may correspondingly be applicable to the other embodiments, even if not explicitly described in these other embodiments. Furthermore, additions and/or combinations and/or alternatives as described for a feature in the context of an embodiment may correspondingly be applicable to the same or similar feature in the other embodiments.

The present disclosure relates to a method of producing a silicalite membrane and the silicalite membrane. For brevity, the method and the silicalite membrane of the present disclosure may be termed herein the present method and the present membrane, respectively.

Silicalite is an inorganic compound that may have a formula of $SiO_2$. Silicalite is one of the polymorphs of silicon dioxide, having a tetrahedral silicon center with two-coordinate oxides. The present silicalite may have dopant incorporated therein, that is, some silicon atoms may be substituted with the dopant. Details of the dopant is described further below.

Advantageously, the present silicalite membrane does not suffer from swelling when used in separation processes, which a polymer membrane and polymer-ceramic composite membrane are susceptible to. The present silicalite membrane is usable and operable for separating an organic solvent from another organic solvent. The present silicalite membrane is not restricted to separating any specific organic solvent, as the present silicalite membrane does not have any constraints arising from being incompatible with any inorganic solvents. That is to say, the present silicalite is versatile for use in separation of any one organic solvent from another. The present silicalite membrane has an average pore size sufficient to provide for separation at the molecular level. In other words, it can be used in separating gaseous organic solvent molecules in applications such as pervaporation.

The present silicalite membrane may have a structure shown in FIG. 2. That is, the present silicalite membrane includes a ceramic substrate. The ceramic substrate may be interchangeably herein termed a ceramic support. The ceramic support may have a buffer layer coated or deposited thereon. A silicalite layer is formed or deposited on the buffer layer. Details of the present silicalite membrane is described herein further below.

The present method of producing the present silicalite membrane helps to confer the advantages mentioned above.

Details of the present method and present silicalite membrane, and advantages associated with the various aspects and embodiments are now described below and demonstrated via the non-limiting examples set out in the examples of the present disclosure.

In the present disclosure, there is provided a method of producing a silicalite membrane. The method includes heating an aqueous solution comprising a dopant precursor and structure-directing template agents to form silicalite seeds incorporated with a dopant.

The dopant precursor may include cerium nitrate hexahydrate, boric acid, tin chloride pentahydrate, cobalt (II) nitrate hexahydrate, sodium aluminate, gallium trichloride, indium acetate, yttrium trichloride, or a mixture thereof. Such dopant precursor provides for a dopant to be incorporated into the silicalite of the present membrane. The dopant incorporated into the silicalite helps to confer different pore sizes of the silicalite membrane. That is, the dopant confers an average pore size of the silicalite layer of the present membrane that differs from the average pore size afforded by a pure silicalite layer. Furthermore, the dopant incorporated into the silicalite changes the surface energy in the pores, which helps to differentiate molecules with different polarity for separation, i.e. either to have the specific molecules pemeate through or reject the specific molecules from passing through.

The structure-directing template agents may include tetrapropylammonium hydroxide and/or tetraethyl orthosilicate. Such structure-directing template agents may be interchangeably termed herein guiding templates, as the structure-directing template agent assists in and/or guides the crystal nucleation and growth of silicalite seed crystals to form a silicalite layer on the ceramic substrate. Advantageously, such structure-directing template agent also helps in improving consistency of silicalite crystal sizes, growth orientation, and forming silicalite crystals with hollow structures therein, and hence affecting the pore sizes of the silicalite layer in a similar manner.

In various aspects, heating the aqueous solution includes mixing the structure-directing template agents in water, wherein the structure-directing template agents include tetrapropylammonium hydroxide and tetraethyl orthosilicate.

In various aspects, heating the aqueous solution includes mixing the dopant precursor and the structure-directing template agents to form the aqueous solution, and subjecting the aqueous solution to hydrothermal treatment at a temperature of 100° C. to 200° C., 150° C. to 200° C., 100° C. to 150° C., etc. to form the silicalite seeds and then cooling the aqueous solution containing the silicalite seeds. These temperature ranges render the hydrothermal treatment processes operable with desirably low and/or moderate temperatures, consuming less energy as compared to conventional process above 200° C., and also less risk as extreme pressure conditions are not required.

The present method may further include centrifuging the aqueous solution containing the silicalite seeds to retrieve the silicalite seeds, adding water to the silicalite seeds, repeating the centrifuging and the adding of water until a liquid suspension comprising the silicalite seeds and having a pH of 7 to 8 is attained, drying the liquid suspension, and grinding the silicalite seeds and then calcinating the silicalite seeds at 500° C. to 600° C. Seed formation tends to be sensitive to pH, and the consistency of the seeds' size and/or shape may also be sensitive to pH. A pH significantly above or below this range may lead to seed quality issues, or even no seed growth.

The present method includes depositing a buffer layer on a ceramic substrate prior to depositing the silicalite seeds on the buffer layer. The ceramic substrate may include zeolite, aluminum oxide, titanium oxide, zirconium oxide, or a mixture thereof. Other glassy oxides capable of having the buffer layer formed thereon may be used for the ceramic substrate.

In various aspects, depositing the buffer layer may include heating an acidic solution comprising tetraethyl orthosilicate and an alcohol and then cooling the acidic solution, mixing a surfactant with an extract of the acidic solution, wherein the surfactant comprises hexadecyltrimethylammonium bromide, and heating the surfactant and the extract of acidic solution to form a buffer layer solution. This step improves compatibility between the ceramic substrate, which can be from different commercial supplies, and the silicalite seeds.

In various aspects, depositing the buffer layer may include sealing both ends of the ceramic substrate, that is to say, the ceramic substrate may have a tubular configuration (e.g. a hollow fiber), immersing the ceramic substrate in the buffer layer solution, removing the ceramic substrate at a speed of 1 mm/s to 5 mm/s, 1 mm/s to 4 mm/s, 1 mm/s to 3 mm/s, 1 mm/s to 2 mm/s, etc. from the buffer layer solution, and calcinating the ceramic substrate having the buffer layer solution thereon at 400° C. to 600° C. to have the buffer layer deposited on the ceramic substrate. Such temperatures help to open the pores in the buffer layer, so that the buffer layer does not hinder permeation pathways in the membrane for the filtrate to pass through.

In various aspects, immersing the ceramic substrate in the buffer layer solution includes immersing the ceramic substrate in the buffer layer solution for at least 1 minute, 5 minutes, 10 minutes, etc.

The present method includes contacting the ceramic substrate with a solution comprising the silicalite seeds to form a silicalite layer from the silicalite seeds on the ceramic substrate.

In various aspects, contacting the ceramic substrate with the solution containing the silicalite seeds includes sealing both ends of the ceramic substrate having the buffer layer deposited thereon, immersing the ceramic substrate having the buffer layer deposited thereon in the solution comprising the silicalite seeds, removing the ceramic substrate having the buffer layer deposited thereon from the solution comprising the silicalite seeds at a speed of 1 mm/s to 5 mm/s, drying the ceramic substrate having the silicalite seeds deposited thereon, and repeating the immersing, the removing and the drying steps one or more times. These steps help to confer a sufficiently dense loading of the seeds on the substrate for subsequent secondary growth of the seed to merge and form the continuous crystal layer.

In various aspects, immersing the ceramic substrate having the buffer layer deposited thereon in the solution containing the silicalite seeds includes immersing the ceramic substrate having the buffer layer deposited thereon in the solution containing the silicalite seeds for at least 1 minute. Such a step avoids undesirable water turbulence due to quick operational movement that may unstablize seed loading or even dislodge the seeds loaded.

The present method may further include providing a growth solution that includes the silicalite seeds, immersing the ceramic substrate having the silicalite seeds deposited thereon in the growth solution, and subjecting the ceramic substrate immersed in the growth solution to hydrothermal treatment at a temperature of 100° C. to 200° C. to grow the silicalite seeds on the ceramic substrate. The growth solution aids in secondary growth of silicalite seeds deposited on the buffer layer.

In various aspects, providing the growth solution includes mixing tetrapropylammonium hydroxide and tetraethyl orthosilicate with the dopant precursor in water to form the growth solution.

The present method includes removing the structure-directing template agents to form the silicalite membrane, wherein the silicalite layer comprises silicalite crystals incorporated with a dopant and each of the silicalite crystals has a hollow structure which forms the pores of the silicalite layer. Removal of the structure-directing template agents ensures no blockage of pores of the present membrane, particularly the silicalite layer of the present membrane.

In various aspects, removing the structure-directing template agents includes calcinating the ceramic substrate having the silicalite seeds deposited thereon at a temperature of 500° C. to 600° C.

The present disclosure also provides for a silicalite membrane that includes a ceramic substrate having a buffer layer formed thereon, and a silicalite layer formed on the buffer layer, wherein the silicalite layer comprises silicalite crystals incorporated with a dopant and each of the silicalite crystals has a hollow structure which forms the pores of the silicalite layer.

The silicalite layer is the outermost layer of the present membrane. The silicalite layer is a selective layer that includes silicalite crystals. The silicalite crystals are continuous in that the silicalite crystals are grown and formed into a layer of crystals, i.e. a silicalite crystal continuous layer.

Embodiments and advantages described for the present method of the first aspect can be analogously valid for the present membrane described herein, and vice versa. As the various aspects, embodiments and advantages have already been described above and in the examples demonstrated herein further below, they shall not be iterated for brevity.

In various aspects, the dopant includes cerium, boron, tin, cobalt, aluminum, gallium, indium, yttrium, or a combination thereof. The dopant may depend on the dopant precursor used in the present method.

The buffer layer may include pores having an average size larger than the average size of pores of the silicalite layer but smaller than the average size of pores of the ceramic substrate. In other words, the buffer layer may be interchangeably herein termed a transition layer, as the average pore size of the buffer layer may be between the average pore size of the ceramic substrate and the average pore size of the silicalite layer. That is, the average pore size decreases from ceramic substrate to buffer layer to silicalite layer. Advantageously, the buffer layer maximizes the seed loading density and to buffer any difference in thermal expansion during subsequent thermal treatments and calcination activation step, for example, difference in thermal expansion between silicalite seeds, silicalite layer and the ceramic substrate. After the formation of the buffer layer, the synthesized silicalite crystal seeds may be deposited thereon and continue grow to form the silicalite layer, thereby forming the present membrane.

In various aspects, the substrate may have a tubular configuration. The ceramic substrate may be a hollow fiber. The ceramic substrate may include zeolite, aluminum oxide, titanium oxide, zirconium oxide, or a mixture thereof. Other glassy oxides capable of having the buffer layer formed thereon may be used for the ceramic substrate.

The word "substantially" does not exclude "completely" e.g. a composition which is "substantially free" of a material may be completely absent of the material. Where necessary, the word "substantially" may be omitted from the definition of the present disclosure.

In the context of various embodiments, the articles "a", "an" and "the" as used with regard to a feature or element include a reference to one or more of the features or elements.

In the context of various embodiments, the symbol "—", the terms "about" and "approximately", as applied to a numeric value encompasses the exact value and a reasonable variance, e.g. ±10%, ±5%, ±2%, ±1%, ±0.5%, ±0.2%, ±0.1%, etc.

As used herein, the term "and/or" includes any and all combinations of one or more of the associated listed items.

Unless specified otherwise, the terms "comprising" and "comprise", and grammatical variants thereof, are intended to represent "open" or "inclusive" language such that they include recited elements but also permit inclusion of additional, unrecited elements.

EXAMPLES

The present disclosure relates to a synthesis/fabrication process of silicalite crystal membrane layer that is operable with specific molecular selectivity for molecular level separation (e.g. solvent-solvent separation).

Technical considerations include the configuration, crystal growth control and integrated steps to generate a continuous nano-silicalite crystal layer with a defined permeation size. For example, technical features of the present method can include element doping and a guiding template for nanocrystal growth control, a transition layer for continuous layer integration, secondary growth, and membrane activation.

The present membrane and method of producing the present membrane are described in further details, by way of non-limiting examples, as set forth below. The various steps of the present method are described in some of the examples below.

Example 1: Configuration of Present Crystal Ceramic Membrane

The present silicalite membrane has a pure ceramic membrane for molecular separation configured on a macroporous ceramic tubes, wherein the macroporous ceramic tube (i.e. macroporous ceramic support) provides mechanical support. The molecular separation function is conferred by a crystal separation layer formed on top of the ceramic support. To provide chemical resistance to organic solvent streams and good separation selectivity to various solvent types, this particular separation layer does not involve any polymeric binder or polymeric matrix, instead this separation layer is a continuous crystal membrane layer. The integration of the continuous crystal membrane to the ceramic support can be achieved by crystal synthesis, deposition, and secondary growth. To address the actual molecular separation requirement, specific crystal properties are catered for during crystal synthesis and growth through formulation and parameter control. Furthermore, a critical transition layer is included in order to facilitate the seed deposition and buffer thermal impact in subsequent heating and calcination treatments to get a continuous crystal layer free of any defect. This transition layer is achieved by surface modification on the ceramic support. In summary, the configuration of the crystal ceramic membrane is shown in FIG. 2, which can be referred to as a "support+transition layer+continuous crystal layer" structure.

After integration of a continuous crystal layer, the single tubular ceramic membrane can be packaged into a cross-flow module for solvent separation application, as shown in FIG. 3. An example of the pilot separation system setup and performance are provided herewith to substantiate the method of synthesizing the present silicalite membrane and the present silicalite membrane.

Figure 4:
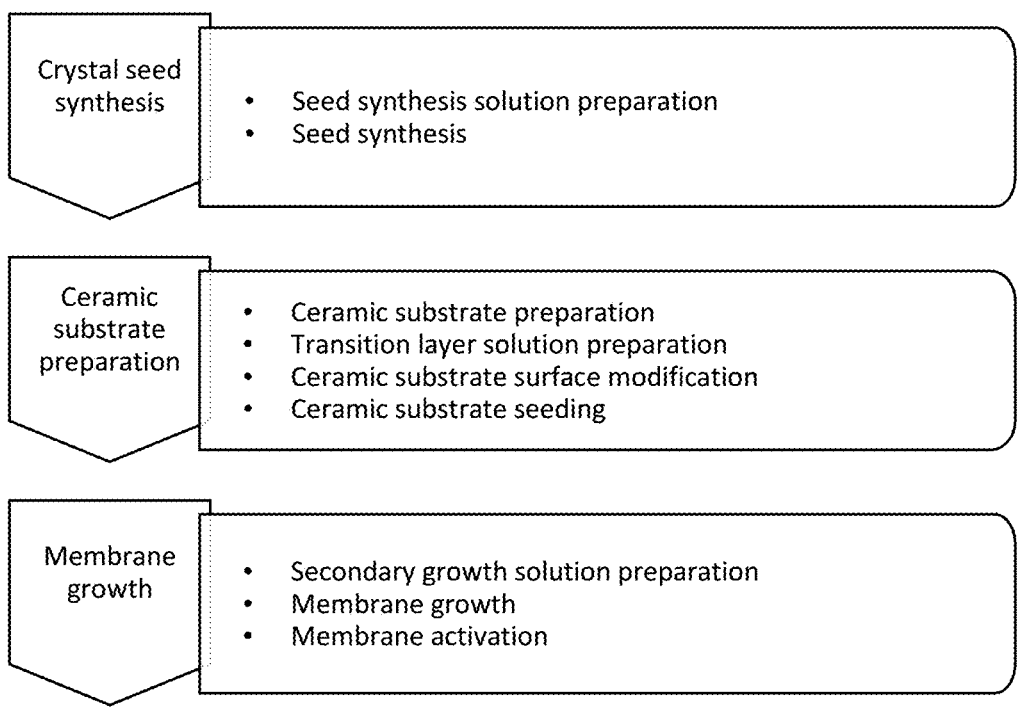
FIG. 4 is a schematic depicting a synthesis process of a continuous silicalite crystal membrane of the present disclosure.

Example 2: Synthesis of a Contiuous Silicalite Crystal Membrane of the Present Disclosure Below are four features (also see FIG. 4) that the present method of synthesis and fabrication of the present membrane may involve.

Dopant and guiding template—to tune the size of the silicalite crystalline hollow structure, an element dopant, e.g. Ce, B, Sn, Co, Al, Ga, In, Y, etc., or a combination thereof, can be introduced to the seed synthesis solution to substitute silicalite structure for different separation size needed based on specific solvent size requirement. To further guide the crystal nucleation and growth, a guiding template, e.g. tetraethyl orthosilicate (TEOS) and/or tetrapropylammonium hydroxide (TPAOH), is also introduced to the seed synthesis solution to improve consistency in crystal size, hollow structure, and growth orientation. This feature can be in seed solution formulation and secondary growth solution formulation.

Transition layer—During the ceramic substrate preparation stage, a transition layer can be formed between the support and the crystal layer. The transition layer provides two important functions (1) to maximize the seed loading density and (2) to buffer the difference in thermal expansion during subsequent thermal treatments and calcination activation step. After the formation of the transition layer on the ceramic support, the synthesized silicalite crystal seeds are deposited on the transition layer, wherein the transition layer is on the ceramic support, to continue to membrane growth. This feature can be used in transition layer solution formulation and ceramic substrate surface modification.

Secondary growth—The membrane growth is performed in a similar manner as hydrothermal crystal synthesis, conditions of which include, element dopant, and use of a guiding template. During the membrane growth stage, crystals are grown and merged completely with each other to form a continuous crystal layer, without amorphous phase, cracks, gaps, and loose structure.

Membrane activation—The last step may be to activate the pure crystal continuous layer. This is a significant step, because of the fact that the hollow structure of the silicalite crystals may be blocked by the guiding templates. The guiding templates may have to be removed before the crystal layer can function as a molecular separation membrane. To activate the crystal layer into a selective layer, a heat treatment process to calcine the guiding template was developed. The calcination is operated at a temperature close to the decomposition point of the guiding template with a careful control of heating rate. Ozone and ultraviolet (UV) exposure are optional to facilitate the calcination process. When the membrane selective layer is completely activated, the surface appearance turns back to white.

Example 3: Synthesis of a-Oriented 12Ce-Sil-1 Membrane

The synthesis of uniform a-Oriented 12Ce-Sil-1 crystal seed is described as follows.

Seed Synthesis Solution Preparation

Solution A: 25 ml of deionized (DI) water was prepared in beaker. 4.8 ml of tetrapropylammonium hydroxide (TPAOH) was added into the beaker. The solution in beaker was stirred with stirring speed of 500 rpm for 15 mins. 3.8 ml of tetraethyl orthosilicate (TEOS) was then added into the above solution and stirred further for 15 mins.

Solution B: 5 ml of DI water was prepared in glass bottle. 0.0948 g of cerium nitrate hexahydrate was added into the 5 ml of DI water and stirred at 200 rpm for 15 mins.

The solutions were then mixed by adding 5 ml of solution B dropwise into 33.6 ml of solution A under stirring, which was further stirred and aged for 24 hrs at room temperature (e.g. 25 to 40° C.).

Seed Synthesis

The above seed synthesis solution was poured into a hydrothermal reactor and sealed tight. The hydrothermal reactor was placed in an oven. The oven was heated from room temperature to 170° C. The oven temperature was kept at 170° C. for 48 hrs. The oven was then cooled down to room temperature. The solution removed from the oven was centrifuged at 10,000 rpm for 5 mins to separate the solid product. The liquid was poured away and the solid product kept. DI water was added to the solid product which was then subjected to centrifugation again, this was repeated (e.g. for another 3 rounds) until the liquid pH reached about 7 to about 8. The solid product was dried in the oven, starting from room temperature to 100° C. and maintained at 100° C. for 12 hrs. The oven was then cooled down to room temperature and solid product removed for grinding using mortar and pestle for 5 mins. The solid product was transferred into a porcelain crucible. The solid product was calcined in a porcelain crucible in furnace, starting from room temperature to 550° C. and maintained at 550° C. for 6 hrs. The furnace was then cooled down to room temperature for retrieving the solid product.

Preparation of the ceramic substrate for membrane growth is described as follows.

Ceramic Substrate (i.e. Support) Cleaning 500 ml of ethanol was prepared in glass bottle. The ceramic substrate was soaked in the glass bottle and the glass bottle was closed tight. The glass bottle was put into an ultrasonic bath, operating at 37 kHz for 30 mins, room temperature. The ceramic substrate was then retrieved from the glass bottle. The ceramic substrate was dried in oven, starting from room temperature to 100° C. and kept at 100° C. for 12 hrs. The oven was then cooled down to room temperature.

Ceramic Substrate Buffer Layer Solution Preparation 63 ml of ethanol was prepared in a conical flask and place into a silicon oil bath on the hot plate. Add 4.9 ml of water and 60 ml of TEOS into the conical flask. The solution was stirred with stirring speed of 300 rpm for 15 mins. Prepare 2M of HCl solution and add 60 µL of 2M of HCl solution into the conical flask. The conical flask was installed with a condenser, with cooling water running through the condenser. The solution was heated from room temperature to 60° C. and kept at 60° C. for 1.5 hrs. Cool down the solution to room temperature. 40 ml of the solution was extracted into a new conical flask and place into the silicon oil bath. 4 g of hexadecyltrimethylammonium bromide (CTAB) was added into the solution and stirred at 300 rpm for 15 mins. 0.5 ml of 2M HCl solution was added into the new conical flask under stirring. The condenser was installed on-top of the new conical flask with cooling water running. Heat the solution under stirring from room temperature to 50° C. Keep the solution under stirring at 50° C. for 3 days. Cool down the solution to room temperature. Extract 1 ml of the above solution and dilute with 29 ml of ethanol and keep in capped glass bottle.

Ceramic Substrate Modification

The solution kept in the capped glass bottle was stirred for 15 mins at stirring speed of 200 rpm, 20 ml of which was then poured into a test tube. Seal the ceramic substrate both-end with para-film. Dip the ceramic substrate (100 mm length with OD: 12 mm) into the solution for 1 min. OD denotes for outer diameter. The ceramic substrate was removed from the solution at a speed of 1 mm/s to have the solution coated on the outer surface of the ceramic for forming a transition layer thereon. Dry the modified ceramic substrate in the oven, starting from room temperature to 80° C. Keep the oven temperature at 80° C. for 12 hrs. Cool down the oven to room temperature. Transfer the modified ceramic substrate into porcelain crucible and place vertically. Calcine the modified ceramic substrate in furnace with porcelain crucible, starting from room temperature to 480° C. Keep the furnace temperature at 480° C. for 4 hrs. The furnace was then cooled down to room temperature for retrieving the modified ceramic substrate.

Ceramic Substrate Seeding 20 ml of DI water was prepared in glass bottle. Add 0.202 g of crystal seed into glass bottle, which was then sonicated using ultrasonic bath, operating at 37 kHz for 15 mins, room temperature. The solution was poured into a test tube. Seal the modified ceramic substrate both-end with para-film. Dip, e.g. immediately, the modified ceramic substrate into the solution for 1 min. The modified ceramic substrate was removed from the solution at a rate of 1 mm/s to 5 mm/s to have the seeds coated on the outer surface of the modified ceramic substrate for seeding the modified ceramic substrate. Dry the seeded ceramic substrate in an oven, starting from room temperature to 60° C. and keep the oven temperature at 60° C. for 12 hrs. Cool down the oven to room temperature. All of these steps may be repeated for the seeded ceramic substrate.

Growth and merging of the crystal seed into forming the present membrane is described as follows.

Growth Solution Preparation

Solution A: Prepare 79.5 ml of deionized (DI) water in beaker. Add 6.3 ml of tetrapropylammonium hydroxide (TPAOH) into beaker. Stir the solution with stirring speed of 500 rpm for 15 mins. Add 8.5 ml of tetraethyl orthosilicate (TEOS) into the above solution and stir further for 15 mins.

Solution B: Prepare 10 ml of DI water in glass bottle. Dissolve 0.213 g of cerium nitrate hexahydrate into glass bottle and stir at 200 rpm for 15 mins.

The solutions were then mixed by adding 10 ml of solution B dropwise into 94.3 ml of solution A under stirring, which was then further stirred and aged the mixed solution for 24 hrs at room temperature.

Growth

The growth solution was poured into a hydrothermal reactor. Seal the seeded ceramic substrate both-end with teflon tape and the seeded ceramic substrate was placed vertically into hydrothermal reactor and sealed tight. Place the hydrothermal reactor into the oven. Heat the oven from room temperature to 170° C. and the oven temperature was kept at 170° C. for 24 hrs. Cool down the oven to room temperature. The synthesized membrane was retrieved and the teflon tape was removed. The synthesized membrane was then soaked in DI water for 10 mins with DI water running. Dry the membrane in the oven, starting from room temperature to 60° C. and keep the oven temperature at 60° C. for 48 hrs. Cool down the oven to room temperature.

Membrane Activation

Place the dried membrane vertically into porcelain crucible. Transfer the dried membrane with porcelain crucible into the furnace. Calcine the membrane in the furnace, starting from room temperature to 550° C. at heating rate of 0.2° C./min and keep the furnace temperature at 550° C. for 6 hrs. Cool the furnace to room temperature.

Example 4: Synthesis of b-Oriented 12Ce-Sil-1 Membrane

The synthesis of uniform b-Oriented 12Ce-Sil-1 crystal seed is described as follows.

Seed Synthesis Solution Preparation

Solution A: Prepare 25 ml of deionized (DI) water in beaker. Add 4.8 ml of tetrapropylammonium hydroxide (TPAOH) into beaker. Stir the solution with stirring speed of 500 rpm for 15 mins. Add 3.8 ml of tetraethyl orthosilicate (TEOS) into the above solution and stir further for 15 mins.

Solution B: Prepare 5 ml of DI water in glass bottle. Dissolve 0.0948 g of cerium nitrate hexahydrate into 5 ml of DI water and stir at 200 rpm for 15 mins.

The solutions were then mixed by adding 5 ml of solution B dropwise into 33.6 ml of solution A under stirring, which was further stirred and aged for 24 hrs at room temperature.

Seed Synthesis

Pour the seed synthesis solution into a hydrothermal reactor and sealed tight. Place the hydrothermal reactor in the oven. Heat the oven from room temperature to 170° C. Keep the oven temperature at 170° C. for 48 hrs. Cool down the oven to room temperature. The solution was centrifuged at 10,000 rpm for 5 mins to separate the solid product. Pour away the liquid and keep the solid product. DI water was added to the solid product which was then subjected to centrifugation again, this was repeated (e.g. for another 3 rounds) until the liquid pH reached about 7 to about 8. Dry the solid product in the oven, starting from room temperature to 100° C. and kept at 100° C. for 12 hrs. Cool down the oven to room temperature. Grind the solid product using mortar and pestle for 5 mins. Transfer the solid product into a porcelain crucible. Calcine the solid product with porcelain crucible in a furnace, starting from room temperature to 550° C. and the furnace temperature was kept at 550° C. for 6 hrs. Cool down the furnace to room temperature.

Preparation of the ceramic substrate for membrane growth is described as follows.

Ceramic Substrate (i.e. Support) Cleaning

Prepare 500 ml of ethanol in glass bottle. Soak the ceramic substrate into glass bottle. Close tight the glass bottle. Put the glass bottle into the ultrasonic bath, operating at 37 kHz for 30 mins, room temperature. Take out the ceramic substrate from the glass bottle. Dry the ceramic substrate in oven, starting from room temperature to 100° C. and kept at 100° C. for 12 hrs. The oven was cooled down to room temperature.

Ceramic Substrate Buffer Layer Solution Preparation

Prepare 63 ml of ethanol in conical flask and place into the silicon oil bath on the hot plate. Add 4.9 ml of water and 60 ml of TEOS into the conical flask. Stir the solution with stirring speed of 300 rpm for 15 mins. Prepare 2M of HCl solution. Add 60 µL of the 2M of HCl solution into the conical flask. Install the condenser onto the conical flask with cooling water running through the condenser. Heat the solution from room temperature to 60° C. Keep the solution at 60° C. for 1.5 hrs. Cool down the solution to room temperature. 40 ml of the solution was extracted into a new conical flask and place into the silicon oil bath. Add 4 g of hexadecyltrimethylammonium bromide (CTAB) into the solution and stir at 300 rpm for 15 mins. Add 0.5 ml of 2M HCl solution into the new conical flask under stirring. Install the condenser on-top of the new conical flask with cooling water running. Heat the solution under stirring from room temperature to 50° C. and the solution was kept under stirring at 50° C. for 3 days. Cool down the solution to room temperature. Take 1 ml of the above solution and dilute with 29 ml of ethanol and keep in capped glass bottle.

Ceramic Substrate Modification

Stir the solution for 15 mins at stirring speed of 200 rpm. Pour 20 ml of solution into test tube. Seal the ceramic substrate both-end with the para-film. Dip the ceramic substrate (100 mm length with OD: 12 mm) into the solution for 1 min. The ceramic substrate was removed from the solution at a rate of 1 mm/s to 5 mm/s to have the solution coated on the outer surface of the ceramic for forming a transition layer thereon. Dry the modified ceramic substrate in the oven, starting from room temperature to 80° C. Keep the oven temperature at 80° C. for 12 hrs. Cool down the oven to room temperature. Transfer the modified ceramic substrate into porcelain crucible and place vertically. Calcine the modified ceramic substrate in furnace with porcelain crucible, starting from room temperature to 480° C. and kept at 480° C. for 4 hrs. Cool down the furnace to room temperature.

Ceramic Substrate Seeding

Prepare 20 ml of DI water in glass bottle. Add 0.202 g of crystal seed into glass bottle. Sonicate using ultrasonic bath, operating at 37 kHz for 15 mins, room temperature. Pour the solution into test tube. Seal the modified ceramic substrate both-end with para-film. Dip immediately the modified ceramic substrate into the solution for 1 min. The modified ceramic substrate was removed from the solution at a rate of 1 mm/s to 5 mm/s to have the seeds coated on the outer surface of the modified ceramic substrate for seeding the modified ceramic substrate. Dry the seeded ceramic substrate in an oven, starting from room temperature to 60° C. Keep the oven temperature at 60° C. for 12 hrs. Cool down the oven to room temperature. All of these steps may be repeated for the seeded ceramic substrate.

Growth and merging of the crystal seed into forming the present membrane is described as follows.

Growth Solution Preparation

Solution A: Prepare 75 ml of deionized (DI) water in beaker. Add 12.5 ml of tetrapropylammonium hydroxide (TPAOH) into beaker. Stir the solution with stirring speed of 500 rpm for 15 mins. Add 8.5 ml of tetraethyl orthosilicate (TEOS) into the above solution and stir further for 15 mins.

Solution B: Prepare 10 ml of DI water in glass bottle. Dissolve 0.213 g of cerium nitrate hexahydrate into glass bottle and stir at 200 rpm for 15 mins.

The solutions were then mixed by adding 10 ml of solution B dropwise into 96 ml of solution A under stirring, which was then further stirred and aged the mixed solution for 24 hrs at room temperature.

Growth

Pour the growth solution into a hydrothermal reactor. Seal the seeded ceramic substrate both-end with teflon tape. Place the seeded ceramic substrate vertically into hydrothermal reactor and sealed tight. Place the hydrothermal reactor into the oven. Heat the oven from room temperature to 170° C. Keep the oven temperature at 170° C. for 48 hrs. Cool down the oven to room temperature. Take out the synthesized membrane and remove the teflon tape. Soak the synthesized membrane into DI water for 10 mins with DI water running. Dry the membrane in the oven, starting from room temperature to 60° C. Keep the oven temperature at 60° C. for 48 hrs. Cool down the oven to room temperature.

Membrane Activation

Place the dried membrane vertically into porcelain crucible. Transfer the dried membrane with porcelain crucible in the furnace. Calcine the membrane in the furnace, starting from room temperature to 450° C. at heating rate of 0.2° C./min. Keep the furnace temperature at 450° C. for 4 hrs. Cool the furnace to room temperature.

Example 5: Synthesis of a-Oriented 04Ce-Sil-1 Membrane

The synthesis of uniform 04Ce-Sil-1 crystal seed is described as follows.

Seed Synthesis Solution Preparation

Solution A: Prepare 25 ml of deionized (DI) water in beaker. Add 4.8 ml of tetrapropylammonium hydroxide (TPAOH) into beaker. Stir the solution with stirring speed of 500 rpm for 15 mins. Add 3.8 ml of tetraethyl orthosilicate (TEOS) into the above solution and stir further for 15 mins.

Solution B: Prepare 5 ml of DI water in glass bottle. Dissolve 0.0316 g of cerium nitrate hexahydrate into 5 ml of DI water and stir at 200 rpm for 15 mins.

The solutions were then mixed by adding 5 ml of solution B dropwise into 33.6 ml of solution A under stirring, which was further stirred and aged for 24 hrs at room temperature.

Seed Synthesis

Pour the seed synthesis solution into hydrothermal reactor and sealed tight. Place the hydrothermal reactor in the oven. Heat the oven from room temperature to 170° C. Keep the oven temperature at 170° C. for 48 hrs. The oven was cooled down to room temperature. The solution was centrifuged at 10,000 rpm for 5 mins to separate the solid product. Pour away the liquid and keep the solid product. DI water was added to the solid product which was then subjected to centrifugation again, this was repeated (e.g. for another 3 rounds) until the liquid pH reached about 7 to about 8. Dry the solid product in the oven, starting from room temperature to 100° C. Keep the oven temperature at 100° C. for 12 hrs. Cool down the oven to room temperature. Grind the solid product using mortar and pestle for 5 mins. Transfer the solid product into porcelain crucible. Calcine the solid product with porcelain crucible in furnace, starting from room temperature to 550° C. Keep the furnace temperature at 550° C. for 6 hrs. Cool down the furnace to room temperature.

Preparation of the ceramic substrate for membrane growth is described as follows.

Ceramic Substrate (i.e. Support) Cleaning

Prepare 500 ml of ethanol in glass bottle. The ceramic substrate was soaked into the glass bottle. Close tight the glass bottle. The glass bottle was put into the ultrasonic bath, operating at 37 kHz for 30 mins, room temperature. Take out the ceramic substrate from the glass bottle. Dry the ceramic substrate in oven, starting from room temperature to 100° C. and kept at 100° C. for 12 hrs. Cool down the oven to room temperature.

Ceramic Substrate Buffer Layer Solution Preparation

Prepare 63 ml of ethanol in conical flask and place into the silicon oil bath on the hot plate. Add 4.9 ml of water and 60 ml of TEOS into the conical flask. Stir the solution with stirring speed of 300 rpm for 15 mins. Prepare 2M of HCl solution. Add 60 µL of 2M of HCl solution into the conical flask. Install the condenser onto the conical flask with cooling water running through the condenser. Heat the solution from room temperature to 60° C. Keep the solution at 60° C. for 1.5 hrs. Cool down the solution to room temperature. Take 40 ml of the solution and put into new conical flask and place into the silicon oil bath. Add 4 g of hexadecyltrimethylammonium bromide (CTAB) into the solution and stir at 300 rpm for 15 mins. Add 0.5 ml of 2M HCl solution into the new conical flask under stirring. Install the condenser on-top of the new conical flask with cooling water running. Heat the solution under stirring from room temperature to 50° C. Keep the solution under stirring at 50° C. for 3 days. Cool down the solution to room temperature. Take 1 ml of the above solution and dilute with 29 ml of ethanol and keep in capped glass bottle.

Ceramic Substrate Modification

Stir the solution for 15 mins at stirring speed of 200 rpm. Pour 20 ml of solution into test tube. Seal the ceramic substrate both-end with the para-film. Dip the ceramic substrate (100 mm length with OD: 12 mm) into the solution for 1 min. The ceramic substrate was removed from the solution at a speed of 1 mm/s to 5 mm/s to have the solution coated on the outer surface of the ceramic for forming a transition layer thereon. Dry the modified ceramic substrate in the oven, starting from room temperature to 80° C. Keep the oven temperature at 80° C. for 12 hrs. Cool down the oven to room temperature. Transfer the modified ceramic substrate into porcelain crucible and place vertically. Calcine the modified ceramic substrate with porcelain crucible in furnace, starting from room temperature to 480° C. Keep the furnace temperature at 480° C. for 4 hrs. Cool down the furnace to room temperature.

Ceramic Substrate Seeding

Prepare 20 ml of DI water in glass bottle. Add 0.202 g of crystal seed into the glass bottle. Sonicate the glass bottle using ultrasonic bath, operating at 37 kHz for 15 mins, room temperature. Pour the solution into a test tube. Seal the modified ceramic substrate both-end with para-film. Dip (e.g. immediately) the modified ceramic substrate into the solution for 1 min. The modified ceramic substrate was removed from the solution at rate of 1 mm/s to 5 mm/s to have the seeds coated on the outer surface of the modified ceramic substrate for seeding the modified ceramic substrate. Dry the seeded ceramic substrate in an oven, starting from room temperature to 60° C. Keep the oven temperature at 60° C. for 12 hrs. Cool down the oven to room temperature. All of these steps may be repeated for the seeded ceramic substrate.

Growth and merging of the crystal seed into forming the present membrane is described as follows.

Growth Solution Preparation

Solution A: Prepare 79.5 ml of deionized (DI) water in beaker. Add 6.3 ml of tetrapropylammonium hydroxide (TPAOH) into beaker. Stir the solution with stirring speed of 500 rpm for 15 mins. Add 8.5 ml of tetraethyl orthosilicate (TEOS) into the above solution and stir further for 15 mins.

Solution B: Prepare 10 ml of DI water in glass bottle. Dissolve 0.0711 g of cerium nitrate hexahydrate into glass bottle and stir at 200 rpm for 15 mins.

The solutions were then mixed by adding 10 ml of solution B dropwise into 94.3 ml of solution A under stirring, which was further stirred and aged for 24 hrs at room temperature.

Growth

Pour the growth solution into a hydrothermal reactor. Seal the seeded ceramic substrate both-end with teflon tape. Place the seeded ceramic substrate vertically into hydrothermal reactor and sealed tight. Place the hydrothermal reactor into the oven. Heat the oven from room temperature to 170° C. Keep the oven temperature at 170° C. for 24 hrs. Cool down the oven to room temperature. Take out the synthesized membrane and have the teflon tape removed. Soak the synthesized membrane into DI water for 10 mins with DI water running. Dry the membrane in the oven, starting from room temperature to 60° C., keeping the oven temperature at 60° C. for 48 hrs. Cool down the oven to room temperature.

Membrane Activation

Place the dried membrane vertically into porcelain crucible. Transfer the dried membrane with porcelain crucible into the furnace. Calcine the membrane in the furnace, starting from room temperature to 550° C. at heating rate of 0.2° C./min. Keep the furnace temperature at 550° C. for 6 hrs. Cool the furnace to room temperature.

Example 6: Synthesis of x-Oriented 12Co-Sil-1 Membrane

The synthesis of uniform 12Co-Sil-1 crystal seed is described as follows.

Seed Synthesis Solution Preparation

Solution A: Prepare 25 ml of deionized (DI) water in beaker. Add 4.8 ml of tetrapropylammonium hydroxide (TPAOH) into beaker. Stir the solution with stirring speed of 500 rpm for 15 mins. Add 3.8 ml of tetraethyl orthosilicate (TEOS) into the above solution and stir further for 15 mins.

Solution B: Prepare 5 ml of DI water in glass bottle. Dissolve 0.0636 g of cobalt (II) nitrate hexahydrate into 5 ml of DI water and stir at 200 rpm for 15 mins.

The solutions were then mixed by adding 5 ml of solution B dropwise into 33.6 ml of solution A under stirring, which was further stirred and aged for 24 hrs at room temperature.

Seed Synthesis

Pour the seed synthesis solution into hydrothermal reactor and sealed tight. Place the hydrothermal reactor in the oven. Heat the oven from room temperature to 170° C. Keep the oven temperature at 170° C. for 48 hrs. Cool down the oven to room temperature. Centrifuge the solution at 10,000 rpm for 5 mins to separate the solid product. Pour away the liquid and keep the solid product. DI water was added to the solid product which was then subjected to centrifugation again, this was repeated (e.g. for another 3 rounds) until the liquid pH reached about 7 to about 8. Dry the solid product in the oven, starting from room temperature to 100° C. Keep the oven temperature at 100° C. for 12 hrs. Cool down the oven to room temperature. Grind the solid product using mortar and pestle for 5 mins. Transfer the solid product into porcelain crucible. Calcine the solid product with porcelain crucible in furnace, starting from room temperature to 550° C. Keep the furnace temperature at 550° C. for 6 hrs. Cool down the furnace to room temperature.

Preparation of the ceramic substrate for membrane growth is described as follows.

Ceramic Substrate (i.e. Support) Cleaning

Prepare 500 ml of ethanol in glass bottle. Soak the ceramic substrate into glass bottle. Close tight the glass bottle. Put the glass bottle into the ultrasonic bath, operating at 37 kHz for 30 mins, room temperature. Take out the ceramic substrate from the glass bottle. Dry the ceramic substrate in oven, starting from room temperature to 100° C. Keep the oven temperature at 100° C. for 12 hrs. Cool down the oven to room temperature.

Ceramic Substrate Buffer Layer Solution Preparation

Prepare 63 ml of ethanol in conical flask and place into the silicon oil bath on the hot plate. Add 4.9 ml of water and 60 ml of TEOS into the conical flask. Stir the solution with stirring speed of 300 rpm for 15 mins. Prepare 2M of HCl solution. Add 60 μL of 2M of HCl solution into the conical flask. Install the condenser onto the conical flask with cooling water running through the condenser. Heat the solution from room temperature to 60° C. Keep the solution at 60° C. for 1.5 hrs. Cool down the solution to room temperature. Take 40 ml of the solution and put into new conical flask and place into the silicon oil bath. Add 4 g of hexadecyltrimethylammonium bromide (CTAB) into the solution and stir at 300 rpm for 15 mins. Add 0.5 ml of 2M HCl solution into the new conical flask under stirring. Install the condenser on-top of the new conical flask with cooling water running. Heat the solution under stirring from room temperature to 50° C. Keep the solution under stirring at 50° C. for 3 days. Cool down the solution to room temperature. Take 1 ml of the above solution and dilute it with 29 ml of ethanol and keep in capped glass bottle.

Ceramic Substrate Modification

Stir the solution for 15 mins at stirring speed of 200 rpm. Pour 20 ml of solution into test tube. Seal the ceramic substrate both-end with the para-film. Dip the ceramic substrate (100 mm length with OD: 12 mm) into the solution for 1 min. The ceramic substrate was removed from the solution at a speed of 1 mm/s to 5 mm/s to have the solution coated on the outer surface of the ceramic for forming a transition layer thereon. Dry the modified ceramic substrate in the oven, starting from room temperature to 80° C. Keep the oven temperature at 80° C. for 12 hrs. Cool down the oven to room temperature. Transfer the modified ceramic substrate into porcelain crucible and place vertically. Calcine the modified ceramic substrate in furnace with porcelain crucible, starting from room temperature to 480° C. Keep the furnace temperature at 480° C. for 4 hrs. Cool down the furnace to room temperature.

Ceramic Substrate Seeding

Prepare 20 ml of DI water in glass bottle. Add 0.202 g of crystal seed into glass bottle. The glass bottle was then sonicated using ultrasonic bath, operating at 37 kHz for 15 mins, room temperature. Pour the solution into test tube. Seal the modified ceramic substrate both-end with para-film. Dip immediately the modified ceramic substrate into the solution for 1 min. The modified ceramic substrate was removed from the solution at 1 mm/s to have the seeds coated on the outer surface of the modified ceramic substrate for seeding the modified ceramic substrate. Dry the seeded ceramic substrate in an oven, starting from room temperature to 60° C. Keep the oven temperature at 60° C. for 12 hrs. Cool down the oven to room temperature. All of these steps may be repeated for the seeded ceramic substrate Growth and merging of the crystal seed into forming the present membrane is described as follows.

Solution A: Prepare 79.5 ml of deionized (DI) water in beaker. Add 6.3 ml of tetrapropylammonium hydroxide (TPAOH) into beaker. Stir the solution with stirring speed of 500 rpm for 15 mins. Add 8.5 ml of tetraethyl orthosilicate (TEOS) into the above solution and stir further for 15 mins.

Solution B: Prepare 10 ml of DI water in glass bottle. Dissolve 0.143 g of cobalt (II) nitrate hexahydrate into glass bottle and stir at 200 rpm for 15 mins.

The solutions were then mixed by adding 10 ml of solution B dropwise into 94.3 ml of solution A under stirring, which was further stirred and aged for 24 hrs at room temperature.

Growth

Pour the growth solution into a hydrothermal reactor. Seal the seeded ceramic substrate both-end with teflon tape. Place the seeded ceramic substrate vertically into hydrothermal reactor and sealed tight. Place the hydrothermal reactor into the oven. Heat the oven from room temperature to 170° C. Keep the oven temperature at 170° C. for 24 hrs. Cool down the oven to room temperature. Take out the synthesized membrane and remove the teflon tape. Soak the synthesized membrane into DI water for 10 mins with DI water running. Dry the membrane in the oven, starting from room temperature to 60° C. Keep the oven temperature at 60° C. for 48 hrs. Cool down the oven to room temperature.

Membrane Activation

Place the dried membrane vertically into porcelain crucible. Transfer the dried membrane with porcelain crucible into the furnace. Calcine the membrane in the furnace, starting from room temperature to 550° C. at heating rate of 0.2° C./min. Keep the furnace temperature at 550° C. for 6 hrs. Cool the furnace to room temperature.

Example 7: Synthesis of x-Oriented 12B-Sil-1 Membrane

The synthesis of uniform 12B-Sil-1 crystal seed is described as follows.

Seed Synthesis Solution Preparation

Solution A: Prepare 25 ml of deionized (DI) water in beaker. Add 4.8 ml of tetrapropylammonium hydroxide (TPAOH) into beaker. Stir the solution with stirring speed of 500 rpm for 15 mins. Add 3.8 ml of tetraethyl orthosilicate (TEOS) into the above solution and stir further for 15 mins.

Solution B: Prepare 5 ml of DI water in glass bottle. Dissolve 0.0135 g of boric acid into 5 ml of DI water and stir at 200 rpm for 15 mins.

The solutions were then mixed by adding 5 ml of solution B dropwise into 33.6 ml of solution A under stirring, which was stirred and aged for 24 hrs at room temperature (e.g. 25 to 40° C.).

Seed Synthesis

Pour the seed synthesis solution into hydrothermal reactor and sealed tight. Place the hydrothermal reactor in the oven. Heat the oven from room temperature to 170° C. Keep the oven temperature at 170° C. for 48 hrs. Cool down the oven to room temperature. Centrifuge the solution at 10,000 rpm for 5 mins to separate the solid product. Pour away the liquid and keep the solid product. DI water was added to the solid product which was then subjected to centrifugation again, this was repeated (e.g. for another 3 rounds) until the liquid pH reached about 7 to about 8. Dry the solid product in the oven, starting from room temperature to 100° C. Keep the oven temperature at 100° C. for 12 hrs. Cool down the oven to room temperature. Grind the solid product using mortar and pestle for 5 mins. Transfer the solid product into porcelain crucible. Calcine the solid product with porcelain crucible in furnace, starting from room temperature to 550° C. Keep the furnace temperature at 550° C. for 6 hrs. Cool down the furnace to room temperature.

Preparation of the ceramic substrate for membrane growth is described as follows.

Ceramic Substrate (i.e. Support) Cleaning

Prepare 500 ml of ethanol in glass bottle. Soak the ceramic substrate into glass bottle. Close tight the glass bottle. Put the glass bottle into the ultrasonic bath, operating at 37 kHz for 30 mins, room temperature. Take out the ceramic substrate from the glass bottle. Dry the ceramic substrate in oven, starting from room temperature to 100° C. Keep the oven temperature at 100° C. for 12 hrs. Cool down the oven to room temperature.

Ceramic Substrate Buffer Layer Solution Preparation

Prepare 63 ml of ethanol in conical flask and place into the silicon oil bath on the hot plate. Add 4.9 ml of water and 60 ml of TEOS into the conical flask. Stir the solution with stirring speed of 300 rpm for 15 mins. Prepare 2M of HCl solution. Add 60 µL of 2M of HCl solution into the conical flask. Install the condenser onto the conical flask with cooling water running through the condenser. Heat the solution from room temperature to 60° C. Keep the solution at 60° C. for 1.5 hrs. Cool down the solution to room temperature. Take 40 ml of the solution and put into new conical flask and place into the silicon oil bath. Add 4 g of hexadecyltrimethylammonium bromide (CTAB) into the solution and stir at 300 rpm for 15 mins. Add 0.5 ml of 2M HCl solution into the new conical flask under stirring. Install the condenser on-top of the new conical flask with cooling water running. Heat the solution under stirring from room temperature to 50° C. Keep the solution under stirring at 50° C. for 3 days. Cool down the solution to room temperature. Take 1 ml of the above solution and dilute with 29 ml of ethanol and keep in capped glass bottle.

Ceramic Substrate Modification

Stir the solution for 15 mins at stirring speed of 200 rpm. Pour 20 ml of solution into test tube. Seal the ceramic substrate both-end with the para-film. Dip the ceramic substrate (100 mm length with OD: 12 mm) into the solution for 1 min. The ceramic substrate was removed from the solution at a speed of 1 mm/s to 5 mm/s to have the solution coated on the outer surface of the ceramic for forming a transition layer thereon. Dry the modified ceramic substrate in the oven, starting from room temperature to 80° C. Keep the oven temperature at 80° C. for 12 hrs. Cool down the oven to room temperature. Transfer the modified ceramic substrate into porcelain crucible and place vertically. Calcine the modified ceramic substrate in furnace with porcelain crucible, starting from room temperature to 480° C. Keep the furnace temperature at 480° C. for 4 hrs. Cool down the furnace to room temperature.

Ceramic Substrate Seeding

Prepare 20 ml of DI water in glass bottle. Add 0.202 g of crystal seed into glass bottle. The glass bottle was then sonicated using ultrasonic bath, operating at 37 kHz for 15 mins, room temperature. Pour the solution into test tube. Seal the modified ceramic substrate both-end with para-film. Dip (e.g. immediately) the modified ceramic substrate into the solution for 1 min. The modified ceramic substrate was removed from the solution at a rate of 1 mm/s to 5 mm/s to have the seeds coated on the outer surface of the modified ceramic substrate for seeding the modified ceramic substrate. Dry the seeded ceramic substrate in an oven, starting from room temperature to 60° C. Keep the oven temperature at 60° C. for 12 hrs. Cool down the oven to room temperature. All of these steps may be repeated for the seeded ceramic substrate.

Growth and merging of the crystal seed into forming the present membrane is described as follows.

Growth Solution Preparation

Solution A: Prepare 79.5 ml of deionized (DI) water in beaker. Add 6.3 ml of tetrapropylammonium hydroxide (TPAOH) into beaker. Stir the solution with stirring speed of 500 rpm for 15 mins. Add 8.5 ml of tetraethyl orthosilicate (TEOS) into the above solution and stir further for 15 mins.

Solution B: Prepare 10 ml of DI water in glass bottle. Dissolve 0.0304 g of boric acid into glass bottle and stir at 200 rpm for 15 mins.

The solutions were then mixed by adding 10 ml of solution B dropwise into 94.3 ml of solution A under stirring, which was further stirred and aged for 24 hrs at room temperature (e.g. 25 to 40° C.).

Growth

Pour the growth solution into a hydrothermal reactor. Seal the seeded ceramic substrate both-end with teflon tape. Place the seeded ceramic substrate vertically into hydrothermal reactor and sealed tight. Place the hydrothermal reactor into the oven. Heat the oven from room temperature to 170° C. Keep the oven temperature at 170° C. for 24 hrs. Cool down the oven to room temperature. Take out the synthesized membrane and remove the teflon tape. Soak the synthesized membrane into DI water for 10 mins with DI water running. Dry the membrane in the oven, starting from room temperature to 60° C. Keep the oven temperature at 60° C. for 48 hrs. Cool down the oven to room temperature.

Membrane Activation

Place the dried membrane vertically into porcelain crucible. Transfer the dried membrane with porcelain crucible into the furnace. Calcine the membrane in the furnace, starting from room temperature to 550° C. at heating rate of 0.2° C./min. Keep the furnace temperature at 550° C. for 6 hrs. Cool the furnace to room temperature.

Example 8: Synthesis of a-Oriented 10Sn-Sil-1 Membrane

The synthesis of uniform 10Sn-Sil-1 crystal seed is described as follows.

Seed Synthesis Solution Preparation

Solution A: Prepare 10 ml of deionized (DI) water in beaker. Add 14 ml of tetrapropylammonium hydroxide (TPAOH) into beaker. Stir the solution with stirring speed of 500 rpm for 15 mins. Add 11.4 ml of tetraethyl orthosilicate (TEOS) into the above solution and stir further for 1 hr.

Solution B: Prepare 5 ml of DI water in glass bottle. Dissolve 0.18032 g of tin chloride pentahydrate into 5 ml of DI water and stir at 200 rpm for 1 hr.

The solutions were then mixed by adding 5 ml of solution B dropwise into 35.4 ml of solution A under stirring, which was further stirred and aged for 24 hrs at room temperature (e.g. 25 to 40° C.).

Seed Synthesis

Pour the seed synthesis solution into hydrothermal reactor and sealed tight. Place the hydrothermal reactor in the oven. Heat the oven from room temperature to 170° C. Keep the oven temperature at 170° C. for 24 hrs. Cool down the oven to room temperature. Centrifuge the solution at 10,000 rpm for 5 mins to separate the solid product. Pour away the liquid and keep the solid product. DI water was added to the solid product which was then subjected to centrifugation again, this was repeated (e.g. for another 3 rounds) until the liquid pH reached 7-8. Dry the solid product in the oven, starting from room temperature to 100° C. Keep the oven temperature at 100° C. for 12 hrs. Cool down the oven to room temperature. Grind the solid product using mortar and pestle for 5 mins. Transfer the solid product into porcelain crucible. Calcine the solid product with porcelain crucible in furnace, starting from room temperature to 550° C. Keep the furnace temperature at 550° C. for 6 hrs. Cool down the furnace to room temperature.

Preparation of the ceramic substrate for membrane growth is described as follows.

Ceramic Substrate (i.e. Support) Cleaning

Prepare 500 ml of ethanol in glass bottle. Soak the ceramic substrate into glass bottle. Close tight the glass bottle. Put the glass bottle into the ultrasonic bath, operating at 37 kHz for 30 mins, room temperature. Take out the ceramic substrate from the glass bottle. Dry the ceramic substrate in oven, starting from room temperature to 100° C. Keep the oven temperature at 100° C. for 12 hrs. Cool down the oven to room temperature.

Ceramic Substrate Buffer Layer Solution Preparation

Prepare 63 ml of ethanol in conical flask and place into the silicon oil bath on the hot plate. Add 4.9 ml of water and 60 ml of TEOS into the conical flask. Stir the solution with stirring speed of 300 rpm for 15 mins. Prepare 2M of HCl solution. Add 60 µL of 2M of HCl solution into the conical flask. Install the condenser onto the conical flask with cooling water running through the condenser. Heat the solution from room temperature to 60° C. Keep the solution at 60° C. for 1.5 hrs. Cool down the solution to room temperature. Take 40 ml of the solution and put into new conical flask and place into the silicon oil bath. Add 4 g of hexadecyltrimethylammonium bromide (CTAB) into the solution and stir at 300 rpm for 15 mins. Add 0.5 ml of 2M HCl solution into the new conical flask under stirring. Install the condenser on-top of the new conical flask with cooling water running. Heat the solution under stirring from room temperature to 50° C. Keep the solution under stirring at 50° C. for 3 days. Cool down the solution to room temperature. Take 1 ml of the above solution and dilute with 29 ml of ethanol and keep in capped glass bottle.

Ceramic Substrate Modification

Stir the solution for 15 mins at stirring speed of 200 rpm. Pour 20 ml of solution into test tube. Seal the ceramic substrate both-end with the para-film. Dip the ceramic substrate (100 mm length with OD: 12 mm) into the solution for 1 min. The ceramic substrate was removed from the solution at a speed of 1 mm/s to 5 mm/s to have the solution coated on the outer surface of the ceramic for forming a transition layer thereon. Dry the modified ceramic substrate in the oven, starting from room temperature to 80° C. Keep the oven temperature at 80° C. for 12 hrs. Cool down the oven to room temperature. Transfer the modified ceramic substrate into porcelain crucible and place vertically. Calcine the modified ceramic substrate in furnace with porcelain crucible, starting from room temperature to 480° C. Keep the furnace temperature at 480° C. for 4 hrs. Cool down the furnace to room temperature.

Ceramic Substrate Seeding

Prepare 20 ml of DI water in glass bottle. Add 0.202 g of crystal seed into glass bottle. The glass bottle was then sonicated using ultrasonic bath, operating at 37 kHz for 15 mins, room temperature. Pour the solution into test tube. Seal the modified ceramic substrate both-end with para-film. Dip immediately the modified ceramic substrate into the solution for 1 min. The modified ceramic substrate was removed from the solution at 1 mm/s to have the seeds coated on the outer surface of the modified ceramic substrate for seeding the modified ceramic substrate. Dry the seeded ceramic substrate in an oven, starting from room temperature to 60° C. Keep the oven temperature at 60° C. for 12 hrs. Cool down the oven to room temperature. All of these steps may be repeated for the seeded ceramic substrate.

Growth and merging of the crystal seed into forming the present membrane is described as follows.

Growth Solution Preparation

Solution A: Prepare 79 ml of deionized (DI) water in beaker. Add 6.2 ml of tetrapropylammonium hydroxide (TPAOH) into beaker. Stir the solution with stirring speed of 600 rpm for 15 mins. Add 9 ml of tetraethyl orthosilicate (TEOS) into the above solution and stir further for 1 hr.

Solution B: Prepare 10 ml of DI water in glass bottle. Dissolve 0.14252 g of tin chloride pentahydrate into glass bottle and stir at 200 rpm for 1 hr.

The solutions were then mixed by adding 10 ml of solution B dropwise into 94.2 ml of solution A under stirring, and add 2 ml of 25% of ammonia solution into the mixed solution under stirring, which was then further stirred and aged the mixed solution for 24 hrs at room temperature.

3.2 Growth

Pour the growth solution into a hydrothermal reactor. Seal the seeded ceramic substrate both-end with teflon tape. Place the seeded ceramic substrate vertically into hydrothermal reactor and sealed tight. Place the hydrothermal reactor into the oven. Heat the oven from room temperature to 170° C. Keep the oven temperature at 170° C. for 24 hrs. Cool down the oven to room temperature. Take out the synthesized membrane and remove the teflon tape. Soak the synthesized membrane into DI water for 10 mins with DI water running. Dry the membrane in the oven, starting from room temperature to 60° C. Keep the oven temperature at 60° C. for 12 hrs. Cool down the oven to room temperature.

Membrane Activation

Place the dried membrane vertically into porcelain crucible. Transfer the dried membrane with porcelain crucible into the furnace. Calcine the membrane in the furnace, starting from room temperature to 550° C. at heating rate of 0.2° C./min. Keep the furnace temperature at 550° C. for 6 hrs. Cool the furnace to room temperature.

Example 9: Synthesis of a&c-random Orientation 12Al-Sil-1 Membrane

The synthesis of uniform 12Al-Sil-1 crystal seed is described as follows.

Seed Synthesis Solution Preparation

Solution A: Prepare 25 ml of deionized (DI) water in beaker. Add 4.8 ml of tetrapropylammonium hydroxide (TPAOH) into beaker. Stir the solution with stirring speed of 500 rpm for 15 mins. Add 3.8 ml of tetraethyl orthosilicate (TEOS) into the above solution and stir further for 15 mins.

Solution B: Prepare 5 ml of DI water in glass bottle. Dissolve 0.0179 g of sodium aluminate into 5 ml of DI water and stir at 200 rpm for 15 mins.

The solutions were then mixed by adding 5 ml of solution B dropwise into 33.6 ml of solution A under stirring, which was further stirred and aged for 24 hrs at room temperature (e.g. 25 to 40° C.).

Seed Synthesis

Pour the seed synthesis solution into hydrothermal reactor and sealed tight. Place the hydrothermal reactor in the oven. Heat the oven from room temperature to 170° C. Keep the oven temperature at 170° C. for 48 hrs. Cool down the oven to room temperature. Centrifuge the solution at 10,000 rpm for 5 mins to separate the solid product. Pour away the liquid and keep the solid product. DI water was added to the solid product which was then subjected to centrifugation again, this was repeated (e.g. for another 3 rounds) until the liquid pH reached about 7 to about 8. Dry the solid product in the oven, starting from room temperature to 100° C. Keep the oven temperature at 100° C. for 12 hrs. Cool down the oven to room temperature. Grind the solid product using mortar and pestle for 5 mins. Transfer the solid product into porcelain crucible. Calcine the solid product with porcelain crucible in furnace, starting from room temperature to 550° C. Keep the furnace temperature at 550° C. for 6 hrs. Cool down the furnace to room temperature.

Preparation of the ceramic substrate for membrane growth is described as follows.

Ceramic Substrate (i.e. Support) Cleaning

Prepare 500 ml of ethanol in glass bottle. Soak the ceramic substrate into glass bottle. Close tight the glass bottle. Put the glass bottle into the ultrasonic bath, operating at 37 kHz for 30 mins, room temperature. Take out the ceramic substrate from the glass bottle. Dry the ceramic substrate in oven, starting from room temperature to 100° C. Keep the oven temperature at 100° C. for 12 hrs. Cool down the oven to room temperature.

Ceramic Substrate Buffer Layer Solution Preparation

Prepare 63 ml of ethanol in conical flask and place into the silicon oil bath on the hot plate. Add 4.9 ml of water and 60 ml of TEOS into the conical flask. Stir the solution with stirring speed of 300 rpm for 15 mins. Prepare 2M of HCl solution. Add 60 µL of 2M of HCl solution into the conical flask. Install the condenser onto the conical flask with cooling water running through the condenser. Heat the solution from room temperature to 60° C. Keep the solution at 60° C. for 1.5 hrs. Cool down the solution to room temperature. Take 40 ml of the solution and put into new conical flask and place into the silicon oil bath. Add 4 g of hexadecyltrimethylammonium bromide (CTAB) into the solution and stir at 300 rpm for 15 mins. Add 0.5 ml of 2M HCl solution into the new conical flask under stirring. Install the condenser on-top of the new conical flask with cooling water running. Heat the solution under stirring from room temperature to 50° C. Keep the solution under stirring at 50° C. for 3 days. Cool down the solution to room temperature. Take 1 ml of the above solution and dilute with 29 ml of ethanol and keep in capped glass bottle.

Ceramic Substrate Modification

Stir the solution for 15 mins at stirring speed of 200 rpm. Pour 20 ml of solution into test tube. Seal the ceramic substrate both-end with the para-film. Dip the ceramic substrate (100 mm length with OD: 12 mm) into the solution for 1 min. The ceramic substrate was removed from the solution at a speed of 1 mm/s to 5 mm/s to have the solution coated on the outer surface of the ceramic for forming a transition layer thereon. Dry the modified ceramic substrate in the oven, starting from room temperature to 80° C. Keep the oven temperature at 80° C. for 12 hrs. Cool down the oven to room temperature. Transfer the modified ceramic substrate into porcelain crucible and place vertically. Calcine the modified ceramic substrate in furnace with porcelain crucible, starting from room temperature to 480° C. Keep the furnace temperature at 480° C. for 4 hrs. Cool down the furnace to room temperature.

Ceramic Substrate Seeding

Prepare 20 ml of DI water in glass bottle. Add 0.202 g of crystal seed into glass bottle. The glass bottle was then sonicated using ultrasonic bath, operating at 37 kHz for 15 mins, room temperature. Pour the solution into test tube. Seal the modified ceramic substrate both-end with para-film. Dip immediately the modified ceramic substrate into the solution for 1 min. The modified ceramic substrate was removed from the solution at 1 mm/s to have the seeds coated on the outer surface of the modified ceramic substrate for seeding the modified ceramic substrate. Dry the seeded ceramic substrate in an oven, starting from room temperature to 60° C. Keep the oven temperature at 60° C. for 12 hrs. Cool down the oven to room temperature. All of these steps may be repeated for the seeded ceramic substrate.

Growth and merging of the crystal seed into forming the present membrane is described as follows.

Growth Solution Preparation

Solution A: Prepare 79.5 ml of deionized (DI) water in beaker. Add 6.3 ml of tetrapropylammonium hydroxide (TPAOH) into beaker. Stir the solution with stirring speed of 500 rpm for 15 mins. Add 8.5 ml of tetraethyl orthosilicate (TEOS) into the above solution and stir further for 15 mins.

Solution B: Prepare 10 ml of DI water in glass bottle. Dissolve 0.0403 g of sodium aluminate into glass bottle and stir at 200 rpm for 15 mins.

The solutions were then mixed by adding 10 ml of solution B dropwise into 94.3 ml of solution A under stirring, which was then further stirred and aged the mixed solution for 24 hrs at room temperature.

Growth

Pour the growth solution into a hydrothermal reactor. Seal the seeded ceramic substrate both-end with teflon tape. Place the seeded ceramic substrate vertically into hydrothermal reactor and sealed tight. Place the hydrothermal reactor into the oven. Heat the oven from room temperature to 170° C. Keep the oven temperature at 170° C. for 24 hrs. Cool down the oven to room temperature. Take out the synthesized membrane and remove the teflon tape. Soak the synthesized membrane into DI water for 10 mins with DI water running. Dry the membrane in the oven, starting from room temperature to 60° C. Keep the oven temperature at 60° C. for 48 hrs. Cool down the oven to room temperature.

Membrane Activation

Place the dried membrane vertically into porcelain crucible. Transfer the dried membrane with porcelain crucible into the furnace. Calcine the membrane in the furnace, starting from room temperature to 550° C. at heating rate of 0.2° C./min. Keep the furnace temperature at 550° C. for 6 hrs. Cool the furnace to room temperature.

Figure 5:
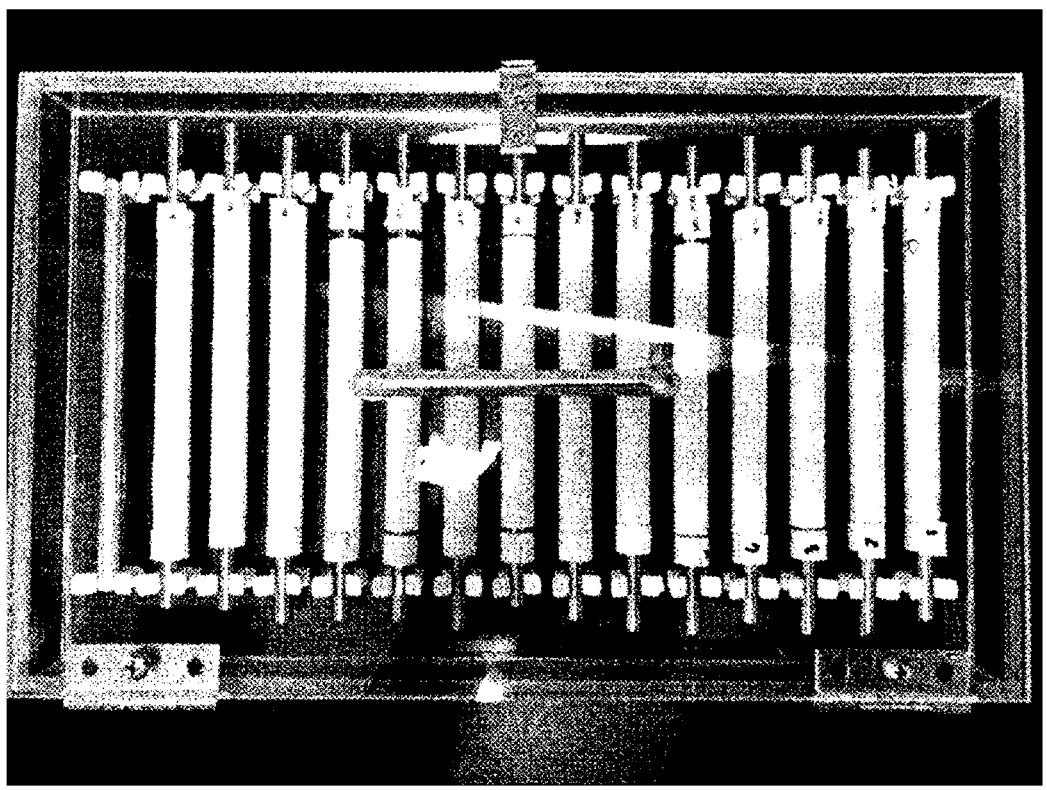
FIG. 5 depicts 10 cm single channel tubular ceramic membranes with different types of molecule-range selective nano-crystal layer on the surface of membranes of the present disclosure.

Example 10A: 10 cm Tubular Membranes after Crystal Layer Integration and Activation FIG. 5 shows an example of a batch of tubular membranes formed using continuous silicalite crystal membranes of the present disclosure.

Example 10B: Housing and Sealing Configuration

Figure 6:
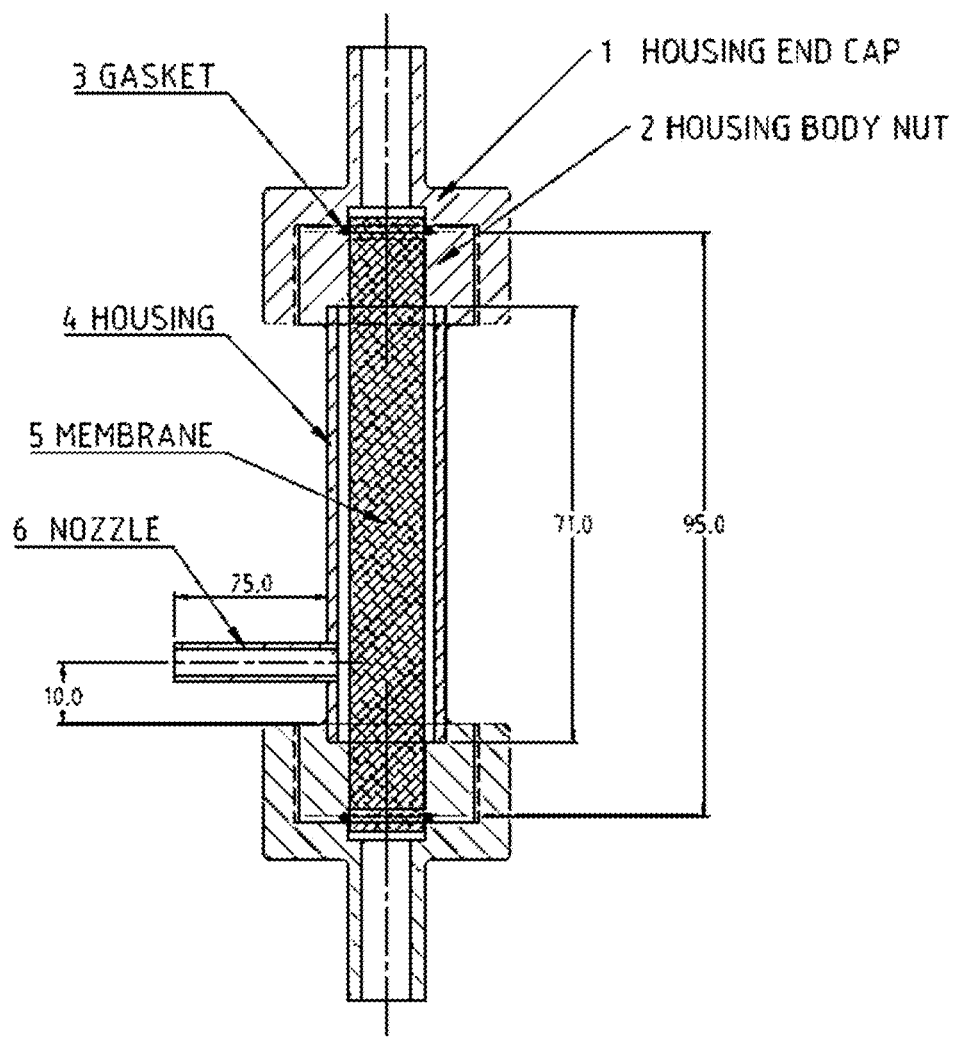
FIG. 6 shows a schematic drawing of an example of the housing for the present membrane. The units of the dimensions indicated in FIG. 6 are in mm.
Figure 7:
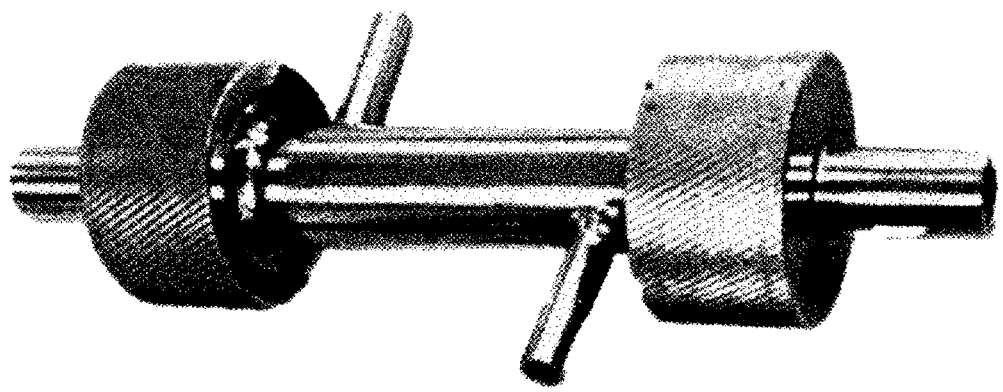
FIG. 7 shows a stainless steel housing configured to house a 10 cm single channel tubular ceramic membrane of the present disclosure, wherein the housing has two housing end caps and sealing o-ring gaskets at both ends.

The present examples describes a housing and sealing method to package the 10 cm single channel tubular membranes described in example 10A (also see FIGS. 6 and 7).

In the housing shown in FIG. 6, the present membrane (5) is fixed in the housing body (2), sealed by two o-ring gaskets (3), and housing end caps (1). The whole housing assembly (4) has two cross flow nozzles (6), which allows the solvent medium to feed in and out. Between the "in" and "out" nozzles solvent medium flows over the membrane surface, where the smaller solvent molecules permeate through the silicalite crystal selective layer and collected from the end cap, which is driven by the differential pressure.

Example 10C: Molecular Separation Process System Using Present Membrane

A molecular separation process can be further facilitated using the present membrane by operating at a temperature close to the medium boiling point, which partially vaporizes the solvent molecules and increases the permeation flux. Such process with a temperature assistance is termed pervaporation. The present membrane can be operable in a pilot scale pervaporation system developed in this example, wherein three or more molecule-range ceramic membrane modules can be included, with integrated programmable logic control (PLC) control panel for process control and monitoring (see FIGS. 8 and 9).

Figure 8:
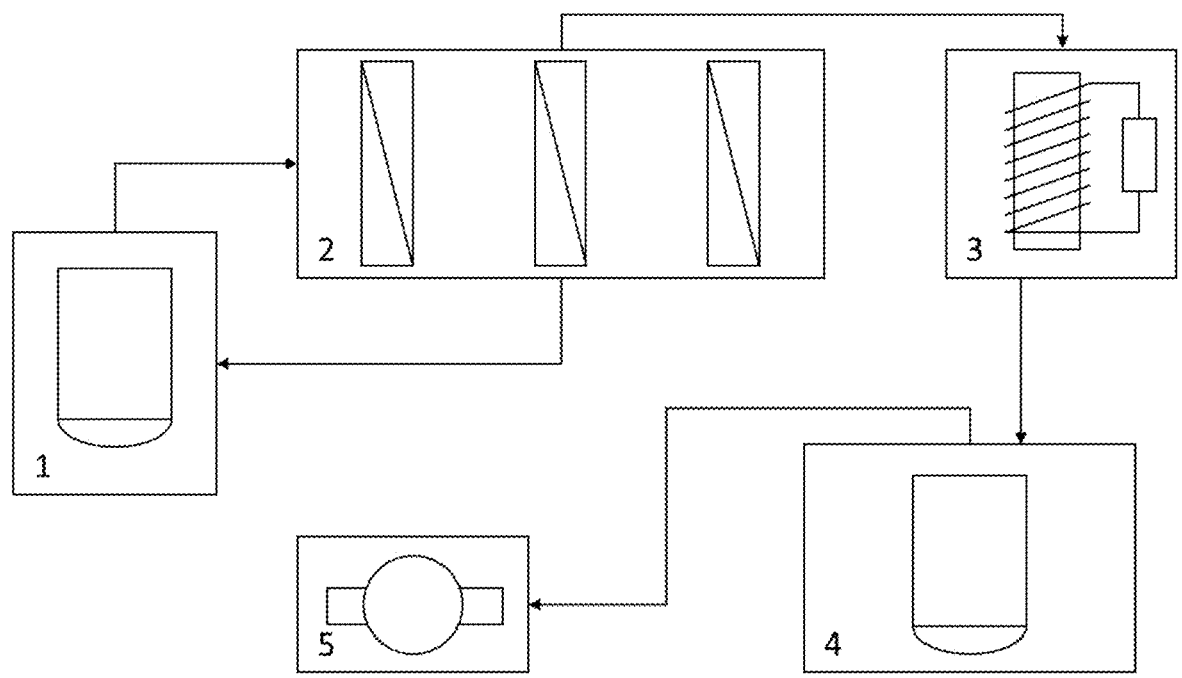
FIG. 8 shows a general process flow diagram of a pervaporation pilot system for performance testing and operable using 10 cm ceramic module (e.g. up to 3 slots for 3 modules) having the ceramic membranes of the present disclosure. 1 denotes for a feed tank with pump and heater. 2 denotes for the 3 ceramic tubular membrane modules housing the present membranes, wherein the membrane modules can be connected in parallel and/or series. 3 denotes the stage for the permeated molecule to condense. 4 denotes for the stage of solvent collection. 5 denotes for the vacuum pump with pressure buffer tank to sustain any pressure difference. Various supporting components such as pumps, valves, measuring and metering components are not illustrated for brevity but a skilled person would have understood how the supporting components may be integrated.
Figure 9:
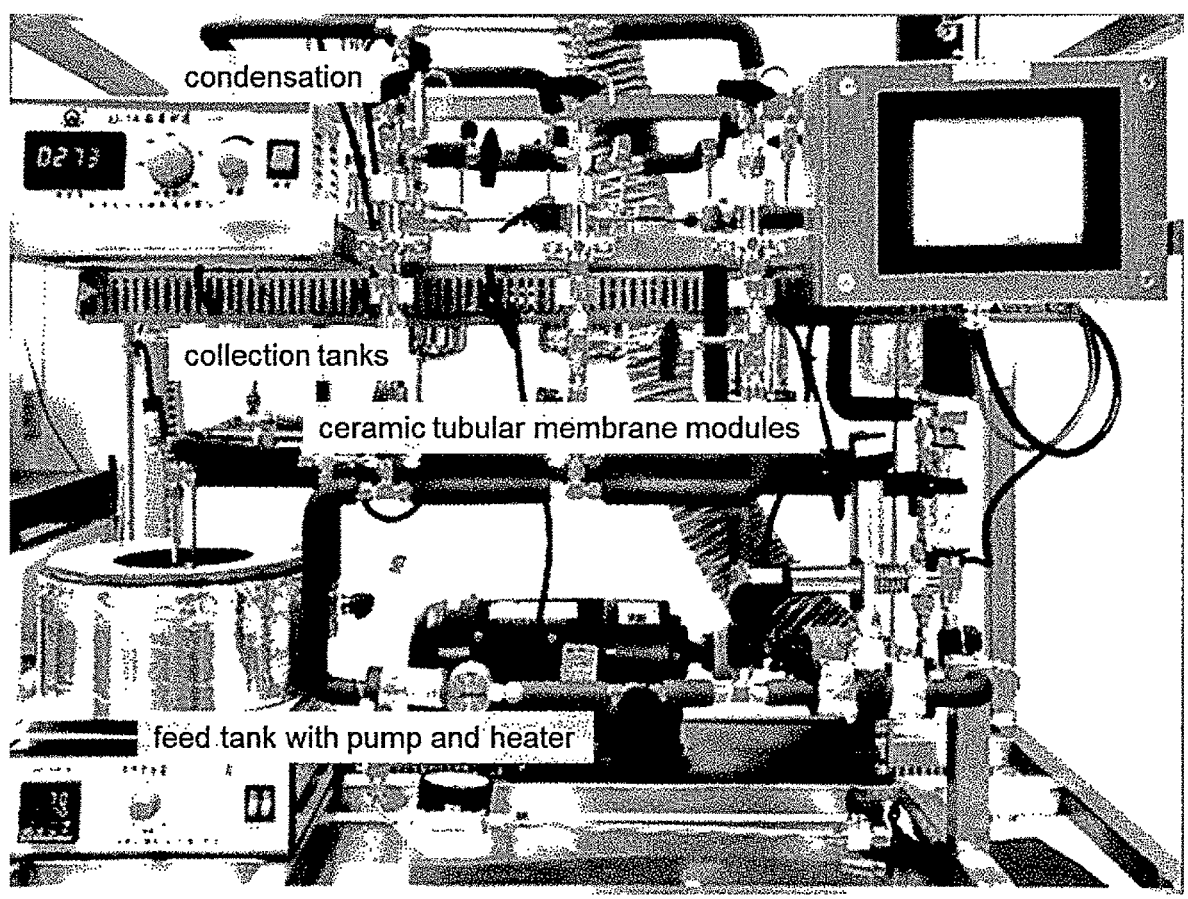
FIG. 9 is a photograph (in black and white) of a ceramic membrane pervaporation system operable for molecular separation performance test. The system is an example wherein three tubular ceramic membrane modules in either parallel and/or serial configuration may be adopted, each module housing a membrane of the present disclosure. Additional slots can be integrated and reserved for in-situ monitoring modules.
Figure 10A:
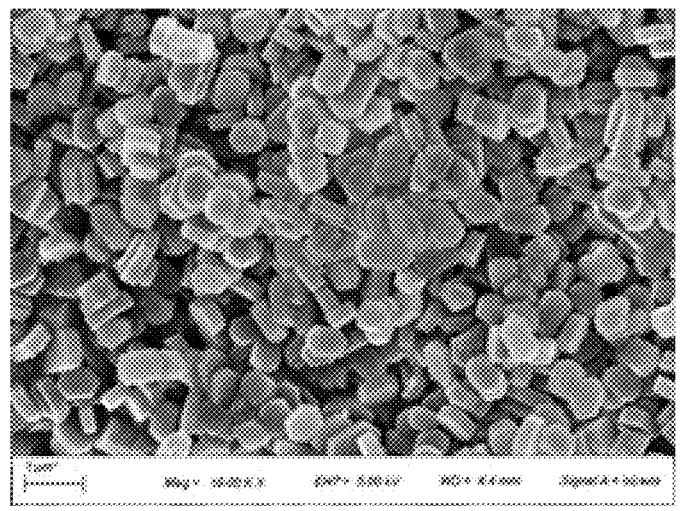
FIG. 10A is a field emission scanning electron microscope (FESEM) image of Ce-silicalite nanocrystals of a membrane of the present disclosure at 10000× magnification, wherein the nanocrystals seeds (i.e. dip-coated) have well-defined size and shape consistency. Scale bar denotes for 1 μm.
Figure 10B:
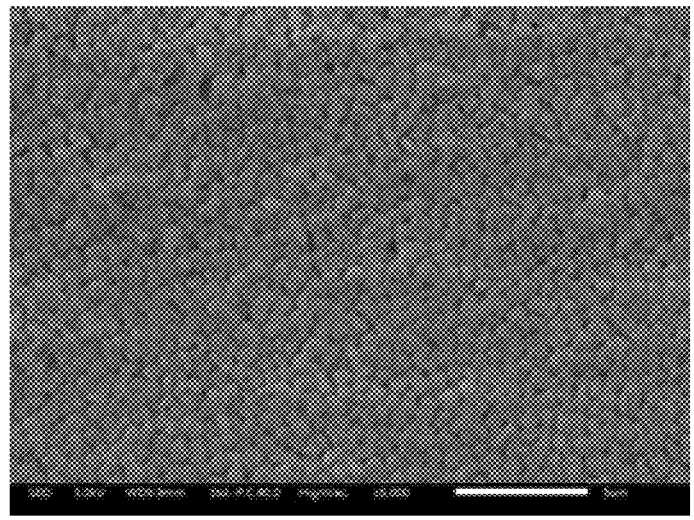
FIG. 10B is a FESEM image of FIG. 10A at 5000× magnification. Scale bar denotes for 5 μm.
Figure 10C:
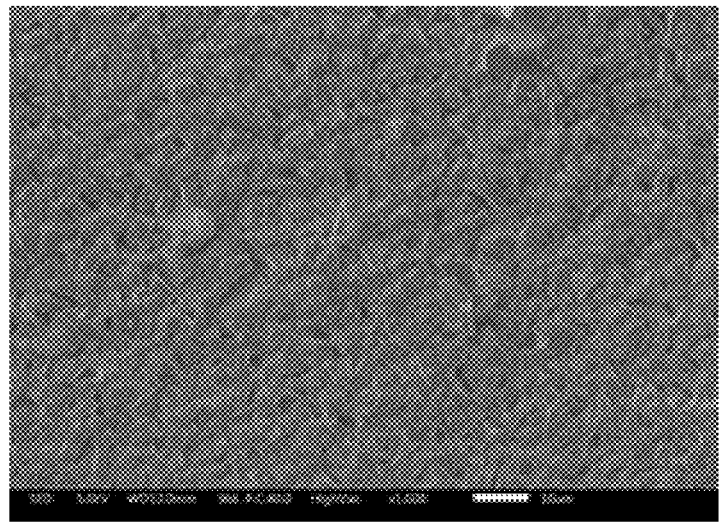
FIG. 10C is a SEM image showing the surface morphology of Ce-silicalite major a-oriented selective layer after secondary growth at 1000× magnification, wherein the nanocrystals form a continuous crystal layer on the surface of a ceramic support. Scale bar denotes for 10 μm.
Figure 10D:
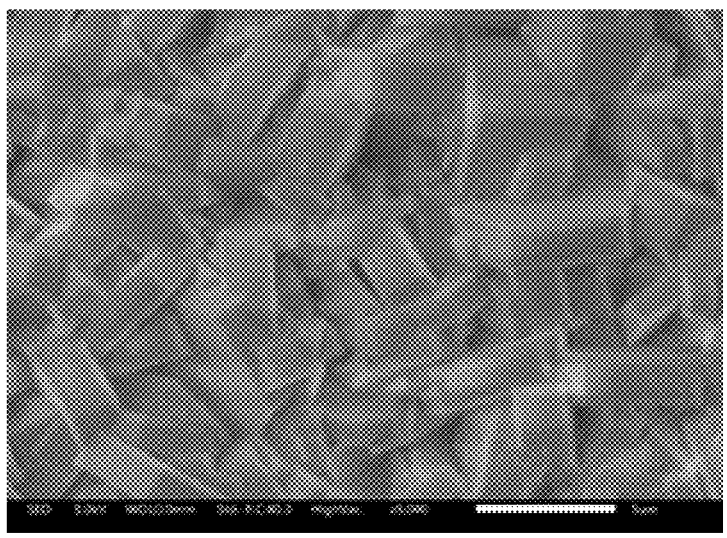
FIG. 10D is a SEM image of FIG. 10C at 5000× magnification. Scale bar denotes for 5 μm.
Figure 11A:
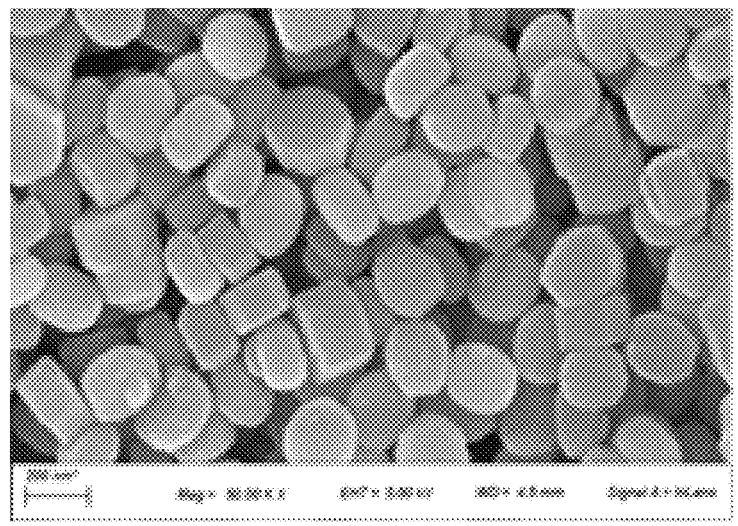
FIG. 11A is a FESEM image of Sn-silicalite nanocrystals of a membrane of the present disclosure at 50000× magnification, wherein the nanocrystals have well-defined size and shape consistency. Scale bar denotes for 200 nm.
Figure 11B:
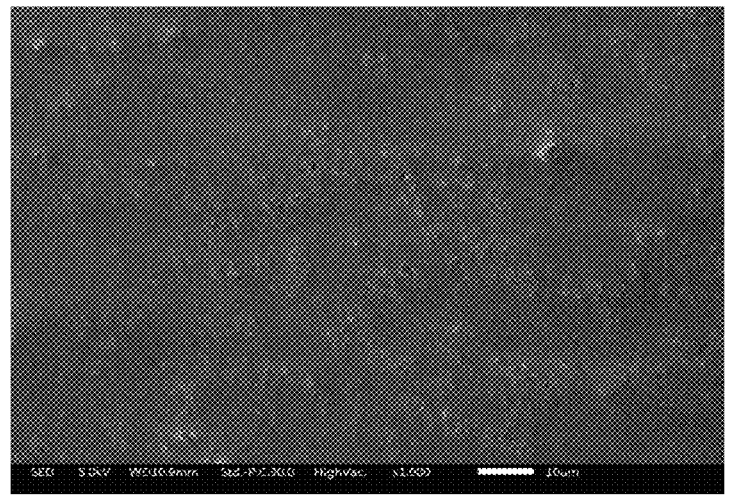
FIG. 11B is a FESEM image of FIG. 11A at 1000× magnification. Scale bar denotes for 10 μm.
Figure 11C:
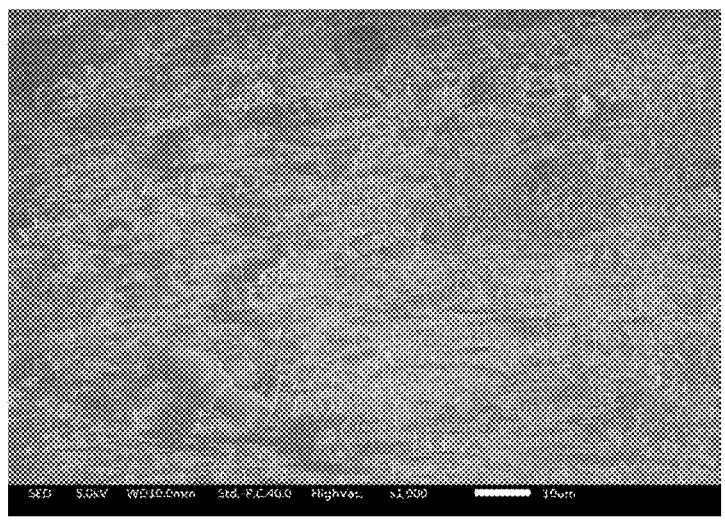
FIG. 11C is a SEM image showing the surface morphology of Sn-silicalite major a-oriented selective layer after secondary growth at 1000× magnification, wherein the nanocrystals form a continuous crystal layer on the surface of a ceramic support. Scale bar denotes for 10 μm.
Figure 11D:
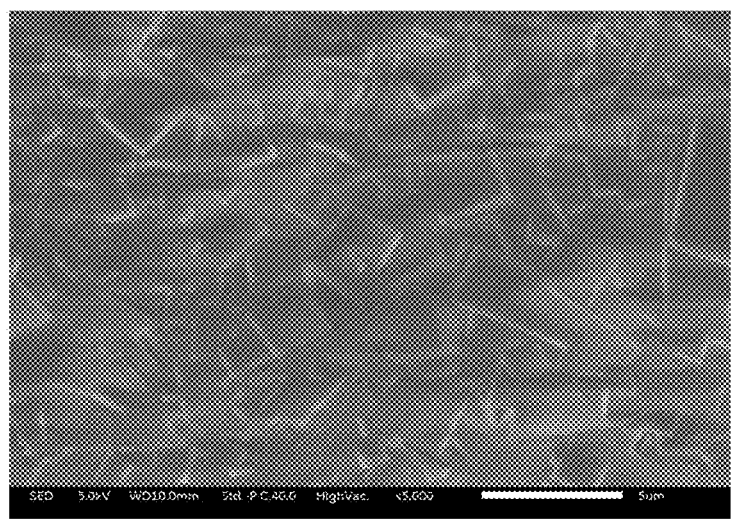
FIG. 11D is a SEM image of FIG. 11C at 5000× magnification. Scale bar denotes for 10 μm.

In this pilot scale pervaporation system, as shown in FIG. 8, 1 denotes for the feed tank with pump and heater. Section 2 is where the three ceramic tubular membrane modules are connected in parallel and/or serial configuration. Section 3 is the stage for permeated molecule to condense. Section 4 is stage of solvent collection, and section 5 is the vacuum pump with pressure buffer tank to sustain the pressure difference.

Example 11A: Present Ce-Doped Silicalite Membrane for Ethanol-Isopropanol (IPA) Separation This example demonstrates a Ce-substituted silicalite ceramic membrane structure (FIG. 10A to 10D) of the present disclosure and its application in an ethanol-IPA separation process. IPA denotes for isopropyl alcohol.

The ethanol-IPA separation is evaluated via pervaporation at 81° C. with the differential pressure of 1 bar. Table 1 below gives the feed concentration, permeate concentration, separation factor and permeate flux.

TABLE 1

Ce-silicalite membrane pervaporation performance in ethanol-IPA separation

| Feed Concentration (wt %) | Permeate Concentration (wt %) | Separation Factor | Permeate (g/m$^2$ · hr) |
|---|---|---|---|
| 4.6/95.4 (ethanol/IPA) | 91/9 (ethanol/IPA) | ~212 | ~65 |

Example 11B: Present Sn-doped Silicalite Membrane for Butyl Acetate-Methyl Isobutyl Ketone (MIBK) Separation This example demonstrates a Sn-substituted silicalite ceramic membrane structure (FIG. 11A to 11D) of the present disclosure and its application in butyl acetate-MIBK separation process. MIBK denotes for methyl isobutyl ketone.

The butyl acetate-MIBK separation by Sn-silicalite membrane is evaluated via pervaporation at 116° C. with the differential pressure of 1 bar. Table 2 below gives the feed concentration with the permeation and separation factor for butyl acetate-MIBK separation.

TABLE 2

Sn-silicalite membrane pervaporation performance in butyl acetate-MIBK separation

| Feed Concentration (wt %) | Permeate Concentration (wt %) | Separation Factor | Permeate (g/m$^2$ · hr) |
|---|---|---|---|
| 5/95 (butyl acetate/MIBK) | 70/30 (butyl acetate/MIBK) | ~50 | ~37.6 |

Example 12: Summary

The present disclosure relates to a process technology (i.e. a method) of crystal growth silicalite crystal membrane layer synthesis and fabrication that confers specific molecular selectivity for use in molecular level separation. The present method and the present membrane, for example, have been sucessfully demonstrated using a pilot prototype assembled in a lab.

The features of the method include (1) element doping and guiding template for nano crystal growth control, (2) transition layer for continuous layer integration, (3) secondary growth, and (4) membrane activation.

In various aspects and embodiments, the present method and membrane involve using an element dopant (e.g. Ce, B, Sn, Co, Al, Ga, In, Y, etc.) to control the crystalline hollow structure and hydrophobicity for specific permeation size requirement.

In various aspects and embodiments, the present method and membrane involves using a guiding template (e.g. TEOS, TPAOH) to improve the consistency in crystalline hollow structure during nanocrystal seed synthesis and secondary growth of the seeds which merges to form the continuous silicalite crystal layer.

In various aspects and embodiments, the present method and membrane involve using a transition layer (i) to maximize the seed loading density and (ii) to buffer the different in thermal expansion during subsequent thermal treatments and calcination activation step, to achieve a defectless continuous crystal layer.

In various aspects and embodiments, the present method and membrane involve using a set of parameters in crystal secondary growth to effectively enlarge and merge crystal nano seeds to form and continuous membrane layer, without amorphous phase, cracks, gaps, and loose structure.

In various aspects and embodiments, the present method and membrane involve calcination of the continuous crystal layer to remove the guiding template with temperature control, ozone and UV assistance, to achieve an open permeable crystal layer as a molecule-range membrane.

While the present disclosure has been particularly shown and described with reference to specific embodiments, it should be understood by those skilled in the art that various changes in form and detail may be made therein without departing from the spirit and scope of the present disclosure as defined by the appended claims. The scope of the present disclosure is thus indicated by the appended claims and all changes which come within the meaning and range of equivalency of the claims are therefore intended to be embraced.

The invention claimed is:

1. A method of producing a silicalite membrane, the method comprising:
   heating an aqueous solution comprising a dopant precursor and structure-directing template agents to form silicalite seeds incorporated with a dopant, wherein the dopant precursor comprises cerium nitrate hexahydrate, tin chloride pentahydrate, cobalt (II) nitrate hexahydrate, gallium trichloride, indium acetate, yttrium trichloride, or a mixture thereof;
   depositing a buffer layer on a ceramic substrate prior to depositing the silicalite seeds on the buffer layer;
   contacting the ceramic substrate with a solution comprising the silicalite seeds to form a silicalite layer from the silicalite seeds on the ceramic substrate; and
   removing the structure-directing template agents to form the silicalite membrane, wherein the silicalite layer comprises silicalite crystals incorporated with a dopant and each of the silicalite crystals has a hollow structure which forms the pores of the silicalite layer.

2. The method of claim 1, wherein heating the aqueous solution comprises mixing the structure-directing template agents in water, wherein the structure-directing template agents comprise tetrapropylammonium hydroxide and tetraethyl orthosilicate.

3. The method of claim 1, wherein heating the aqueous solution comprises:
   mixing the dopant precursor and the structure-directing template agents to form the aqueous solution; and
   subjecting the aqueous solution to hydrothermal treatment at a temperature of 100° C. to 200° C. to form the silicalite seeds and then cooling the aqueous solution comprising the silicalite seeds.

4. The method of claim 1, further comprising:
centrifuging the aqueous solution comprising the silicalite seeds to retrieve the silicalite seeds;
adding water to the silicalite seeds;
repeating the centrifuging and the adding of water until a liquid suspension comprising the silicalite seeds and having a pH of 7 to 8 is attained;
drying the liquid suspension; and
grinding the silicalite seeds and then calcinating the silicalite seeds at 500° C. to 600° C.

5. The method of claim 1, wherein depositing the buffer layer comprises:
heating an acidic solution comprising tetraethyl orthosilicate and an alcohol and then cooling the acidic solution;
mixing a surfactant with an extract of the acidic solution, wherein the surfactant comprises hexadecyltrimethylammonium bromide; and
heating the surfactant and the extract of acidic solution to form a buffer layer solution.

6. The method of claim 1, wherein the ceramic substrate comprises zeolite, aluminum oxide, titanium oxide, zirconium oxide, or a mixture thereof.

7. The method of claim 1, wherein depositing the buffer layer comprises:
sealing both ends of the ceramic substrate, wherein the ceramic substrate has a tubular configuration;
immersing the ceramic substrate in the buffer layer solution;
removing the ceramic substrate at a speed of 1 mm/s to 5 mm/s from the buffer layer solution; and
calcinating the ceramic substrate having the buffer layer solution thereon at 400° C. to 600° C. to have the buffer layer deposited on the ceramic substrate.

8. The method of claim 7, wherein immersing the ceramic substrate in the buffer layer solution comprises immersing the ceramic substrate in the buffer layer solution for at least 1 minute.

9. The method of claim 1, wherein contacting the ceramic substrate with the solution comprising the silicalite seeds comprises:
sealing both ends of the ceramic substrate having the buffer layer deposited thereon;
immersing the ceramic substrate having the buffer layer deposited thereon in the solution comprising the silicalite seeds;
removing the ceramic substrate having the buffer layer deposited thereon from the solution comprising the silicalite seeds at a speed of 1 mm/s to 5 mm/s;
drying the ceramic substrate having the silicalite seeds deposited thereon; and
repeating the immersing, the removing and the drying steps one or more times.

10. The method of claim 9, wherein immersing the ceramic substrate having the buffer layer deposited thereon in the solution comprising the silicalite seeds comprises immersing the ceramic substrate having the buffer layer deposited thereon in the solution comprising the silicalite seeds for at least 1 minute.

11. The method of claim 1, further comprising:
providing a growth solution comprising silicalite seeds;
immersing the ceramic substrate having the silicalite seeds deposited thereon in the growth solution; and
subjecting the ceramic substrate immersed in the growth solution to hydrothermal treatment at a temperature of 100° C. to 200° C. to grow the silicalite seeds on the ceramic substrate.

12. The method of claim 11, wherein providing the growth solution comprises mixing tetrapropylammonium hydroxide and tetraethyl orthosilicate with the dopant precursor in water to form the growth solution.

13. The method of claim 1, wherein removing the structure-directing template agents comprises calcinating the ceramic substrate having the silicalite seeds deposited thereon at a temperature of 500° C. to 600° C.

* * * * *